United States Patent
Fujita et al.

(10) Patent No.: US 6,549,192 B1
(45) Date of Patent: *Apr. 15, 2003

(54) PORTABLE TERMINAL APPARATUS AND AN INFORMATION PROCESSING METHOD THEREFOR

(75) Inventors: Shigeru Fujita, Kawasaki (JP); Norimitsu Mukai, Kawasaki (JP); Miho Yamato, Kawasaki (JP); Keiji Sadai, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/488,413

(22) Filed: Jun. 7, 1995

(30) Foreign Application Priority Data

Jul. 21, 1994 (JP) ............................... 6-169809

(51) Int. Cl.⁷ ................................................ G09G 5/00
(52) U.S. Cl. ......................... 345/173; 340/990; 701/202
(58) Field of Search ................................ 345/133, 173; 340/990, 995; 395/135, 164; 364/424, 444; 701/202

(56) References Cited

U.S. PATENT DOCUMENTS

| | | | | |
|---|---|---|---|---|
| 4,086,632 A | * | 4/1978 | Lions | 364/444 |
| 4,312,577 A | * | 1/1982 | Fitzgerald | 364/424 |
| 4,437,085 A | * | 3/1984 | Salant | 364/444 |
| 5,008,854 A | | 4/1991 | Maeda et al. | 364/900 |
| 5,148,522 A | * | 9/1992 | Okazaki | 345/173 |
| 5,197,009 A | * | 3/1993 | Hoffman, Jr. et al. | 364/443 |
| 5,392,395 A | * | 2/1995 | Fujii et al. | 395/164 |
| 5,487,139 A | * | 1/1996 | Taylor et al. | 395/135 |
| 5,539,429 A | * | 7/1996 | Yano et al. | 345/173 |
| 5,543,788 A | * | 8/1996 | Mikuni | 340/990 |
| 5,552,989 A | * | 9/1996 | Bertrand | 340/990 |

FOREIGN PATENT DOCUMENTS

| | | |
|---|---|---|
| DE | G 91 02 892.2 | 3/1991 |
| JP | 2-304587 | 12/1990 |
| JP | 5-158771 | 6/1993 |
| JP | 6-19916 | 1/1994 |
| JP | 6-103237 | 4/1994 |
| JP | 6-197178 | 7/1994 |

OTHER PUBLICATIONS

Sugie et al.; *CARGuide—on–board computer for automobile route guidance*; AFIPS Conference Proceedings: 1984 National Computer Conference; Jul. 9–12, 1984. pp. 697–706.

Copy of Japanese Patent Office Action for corresponding Japanese Patent Application No. 6–169809 dated Apr. 17, 2001.

* cited by examiner

*Primary Examiner*—Amare Mengistu
(74) *Attorney, Agent, or Firm*—Armstrong, Westerman & Hattori, LLP

(57) ABSTRACT

In a portable terminal apparatus, character information corresponding to map information of destination is displayed or updated. The information such as the map information of destination is entered from an information input unit employed in the portable terminal apparatus, and a display sequence is determined by a display sequence determining unit. A position of destination is set by using a pen and the like by the portable terminal apparatus. The set position data is transferred to a host computer so as to update map data stored in the host computer. With the execution of the above-described operations, operability of the portable terminal apparatus can be improved, and the customer can be quickly and surely managed.

21 Claims, 21 Drawing Sheets

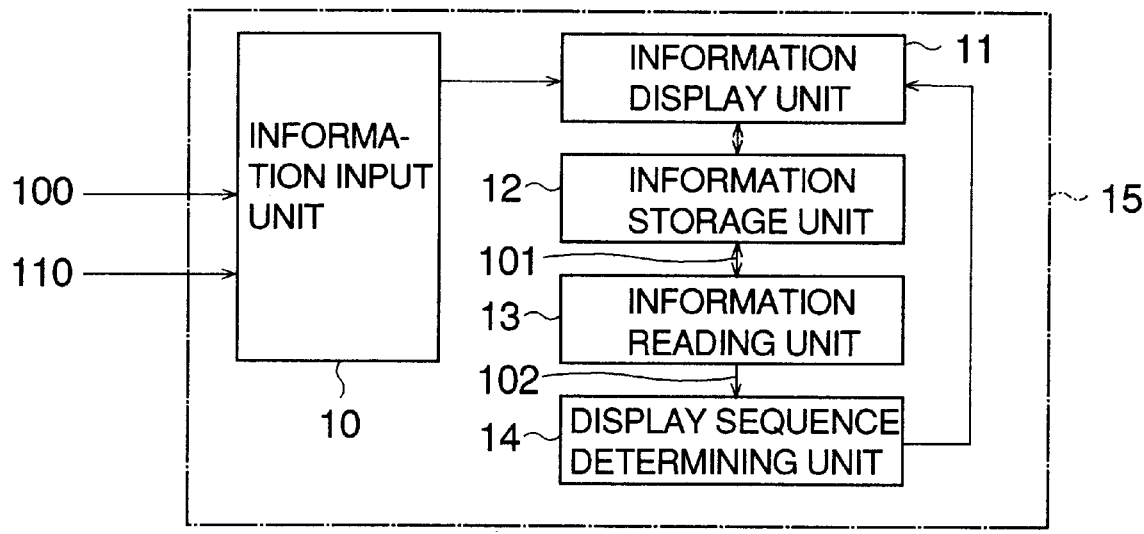
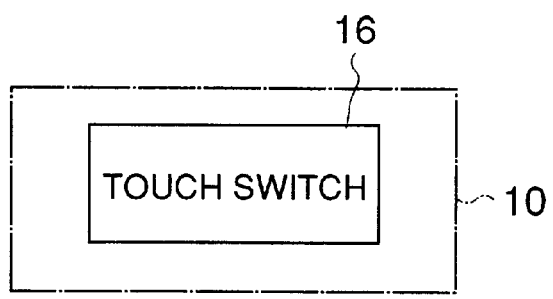
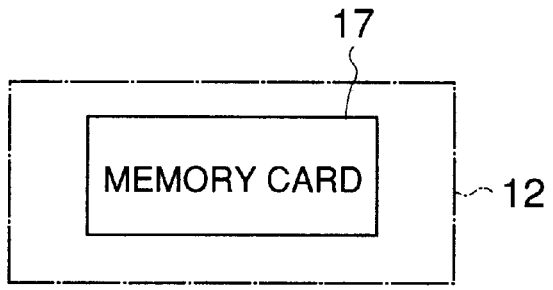

```
***** CUSTOMER LIST *****

NAME    ADDRESS                        ~35
(1) ☐A  MACHIDA CITY XXX1-2-3
(2) ☐B  MACHIDA CITY XXX2-3-4
(3) ☐C  MACHIDA CITY XXX3-4-5
(4) ☐D  MACHIDA CITY XXX4-5-6

35d ~ MAP
```

FIG. 35

| CUSTOMER No. | MAP No. | POSITION X | POSITION Y |
|---|---|---|---|
| XXXXXX | XX | XX | XX |
| 400 | 401 | 402 | 403 |

FIG. 36

| MAP No. | MAP IMAGE DATA |
|---|---|
| XX | ................ |
| 600 | 601 |

PORTABLE TERMINAL APPARATUS AND AN INFORMATION PROCESSING METHOD THEREFOR

BACKGROUND OF THE INVENTION

The present invention relates to a portable terminal apparatus, and more specifically, to a portable terminal apparatus and an information processing method for displaying character information corresponding to map information about destination.

Conventionally, there are electronic notebooks, book type personal computers, and the like used as the portable terminal apparatus.

In such portable terminal apparatuses, various information such as addresses, names, birth days, names of working offices, and hobbies are written into the relevant storage regions, and can be managed.

In an electronic notebook, for instance, various information such as addresses, names, birth days, names of working offices, and hobbies can be easily written in a column or page unit.

In a book-type personal computer, not only character information, but also image information such as graphic information can be written into a storage region.

On the other hand, there are possibilities that the above-described electronic notebooks and book type personal computers are utilized for business purposes as well as to manage personal information.

That is, when these portable terminal apparatus are used in the business field, they are used to manage customers for salesman, to classify development scheme information for researchers and engineers, and also to classify technical information such as magazines and publications.

For personal use, these portable terminal apparatuses are employed so as to manage addresses of individual names, a home telephone number, and a telephone number of own office.

In a book type personal computer, a document is formed, statistical information is formed, and graphic information is formed.

Furthermore, as concrete examples of business use, such salesman belonging to, for instance, insurance firms and financial institutions input contract data and the like into book type portable terminal apparatuses which are brought into visiting destination.

However, in the above-described portable terminal apparatuses, even if either the character information, or the image information can be written, the image information corresponding to the character information, for instance, the map information, or the character information corresponding to this map information cannot be written, or displayed in connection with the map information.

As a consequence, in such a portable terminal apparatus, for instance, when the salesman belonging to the insurance and financial firms enter the contract data into an electronic notebook type terminal apparatus, map information functioning as a mark for visiting destination could not be written together with the contract data into the internal memory.

(1). As a result, in this conventional portable terminal apparatus, it could not be quickly recognized how to achieve effective visits by taking a proper visiting order for customers based on, for example, the map information and the contract data, and also which customer should be visited at the next time.

(2). Also, since the contract information about the customer to be visited could not be immediately recognized from the map information functioning as a mark of this customer in this conventional terminal apparatus, it could not be recognized at a first glance which customer has already made the contract.

(3). Furthermore, the salesman should bring back to his office such a portable terminal apparatus into which various information about the addresses and names of the customers have been written. Thereafter, other staff members should newly form the map information based on the address information of the customers by using the host computer.

SUMMARY OF THE INVENTION

The present invention has been made in an attempt to solve the above-described problems, and therefore, has an object to achieve that information about destination can be effectively and correctly acquired by forming a map of destination, and further list information related to contents of contract and exhibition information can be displayed based on the map information.

Another object of the present invention is to provide a portable terminal apparatus capable of updating map information stored in a host computer via a data line, or a memory card.

A portable terminal apparatus, according to a first aspect of the present invention, is comprised of:

an information input unit for inputting information required to make a layout of an address position on a map, and also information about either a content of a transaction, or a personal address;

a map information display unit for displaying the information inputted from said information unit;

an information storage unit for storing information required to make a layout of a map of destination on said map information display unit, and also the information about either the transaction content, or the personal information;

an information reading unit for reading the information stored in said information storage unit; and a display sequence determining unit for determining a display sequence of said information display unit based on a read signal read out from said information reading unit.

The information input unit of this portable terminal apparatus may include such a device on which a touch switch of a display screen is provided.

For instance, the customer number, the coordinate data, the map data, and the contract data are entered by touching this touch switch with a pen, or a finger.

The display sequence determining unit shown in FIG. 4 determines the display sequence of the map information display unit based on the read signal read out from the information reading unit.

A CPU is an example of this display sequence determining unit.

In a portable terminal apparatus, according to a second aspect of the present invention, equipped with an information processing unit for processing information such as image information, the portable terminal apparatus is comprised of:

an information input unit for inputting map information of destination, either information about a content of contract, or personal information into said information processing unit;

an information display unit for displaying the information entered from said information input unit;

an information storage unit for storing the information displayed on said information display unit;

an information reading unit for reading map information stored in said information storage unit;

a display sequence determining unit for determining a display sequence based on a read signal sent from said information reading unit;

a display sequence determining information display unit for displaying the display sequence determining information determined by said display sequence determining unit; and a designation unit for designating a visiting order with a top priority on a map displayed on said display sequence determining information display unit.

The display sequence determining unit indicated in FIG. 5 determines to display a list of customer data designated in the visiting order.

Further, in this portable terminal apparatus, the information display unit may include a designation display unit for displaying the information on the map designated from a display screen of the display in accordance with the display sequence determined by the display sequence determining unit.

In the information display unit shown in FIG. 5, the display is made on the map designated from the display screen of the display in accordance with the display sequence determined by the display sequence determining unit.

In accordance with the portable terminal apparatus of the present invention, for instance, the map information of destination is inputted from the map information input unit of the portable terminal apparatus, and the display sequence is determined by the display sequence determining unit.

Also, in the portable terminal apparatus of the present invention, for instance, the map information is entered from the map information input unit by touching the touch switch on the display screen by using a pen, or a finger of an operator.

As a result, operability of this portable terminal apparatus can be improved.

In accordance with the portable terminal apparatus of the present invention, since the map information storage unit is arranged by the memory card, the map information written into this memory card is fetched into the host computer, so that the map information can be newly stored in the storage unit of this host computer.

Accordingly, the map information of the destination stored in the host computer can be easily updated.

In the portable terminal apparatus of the present invention, for instance, the display sequence information determined in the display sequence determining unit is transferred to the host computer.

In case of business use, for example, this host computer is provided at a branch office, or a head main office, so that the map information written into the storage unit of the portable terminal apparatus can be transmitted to the host computer in the on-line manner.

As a consequence, since the destination information such as a new contractor can be immediately obtained, customer management can be quickly performed.

Also, in the portable terminal apparatus according to the present invention, the display sequence information determined by the display sequence determining unit is represented on the map information display unit, and the visiting sequence is designated on this displayed map by the designation unit.

In this designation unit, the visiting sequence is designated. For example, a designation is made in such a manner that a first visit is MR. A, a second visit is MR. B, and a third visit is MR. C. Also, a list of customer information such as names/addresses of customers can be displayed.

In the designation unit, a visit mark is designated. When MR. D is visited, for instance, the visit mark is designated and displayed, so that another list of the next visiting customers can be represented.

In addition, in the portable terminal apparatus according to the present invention, for instance, the map position designated from the display screen of the display is registered in the information storage unit in combination with the customer data.

On the other hand, the list representation of the customer data is determined in the designated visiting sequence by the display sequence determining unit in the portable terminal apparatus according to the present invention.

In the portable terminal apparatus of the present invention, the customer data is displayed on the map designated from the display screen in accordance with the display order determined by the display sequence determining unit in the information display unit.

As a consequence, according to the first aspect of the present invention, the destination map information is manually entered from the map information input unit of the portable terminal apparatus. There is such an advantage that the display sequence can be determined by the display sequence determining unit.

The map information input unit has an advantage in that operability can be improved by entering the information by touching the touch switch displayed on the display screen with a pen or a finger.

Also, since the map information storage unit is constructed of the memory card, the map information written into this memory card is read into the host computer, and then the new map information can be stored in the storage unit of this host computer. As a consequence, there is such an advantage that the destination map information of the host computer can be readily updated.

On the other hand, the determined display sequence information can be sent to the host computer in the display sequence determining unit.

In case of business use, this host computer is installed at a branch office, or a head main office. Thus, the destination map information written into the storage unit of the portable terminal apparatus can be transmitted via the data line to the host computer, so that the destination map information can be quickly and surely updated.

As a result, since the destination information such as the new contractor can be immediately obtained, the customer management can be immediately performed.

Also, according to the second aspect of the present invention, the display sequence information determined by the display sequence determining unit is represented on the map information display unit, and the visiting sequence can be designated on the displayed map by the designation unit.

As a consequence, the map of this destination is formed, whereby the destination can be effectively and correctly acquired, and also such list information as the contract contents and the exhibition news can be quickly indicated on the image display unit based on the map information.

Also, the map position designated from the display screen of the display is registered in the information storage unit in combination with the customer data, so that both the map position and the customer data can be quickly read.

Furthermore, the list representation of the customer data is determined in accordance with the designated visiting order by the display sequence determining unit, so that the customers can be effectively visited.

On the other hand, in the information display unit, the customer data are displayed on the map designated from the display screen of the portable terminal apparatus in accordance with the customers order determined by the display sequence determining unit, so that the desired customers can be sequentially displayed on the display screen.

BRIEF DESCRIPTION OF THE DRAWINGS

FIG. 1 is a schematic diagram for explaining a basic arrangement of an overall portable terminal apparatus according to a first embodiment of the present invention;

FIG. 2 is a schematic diagram for explaining the basic arrangement of the first embodiment of the present invention;

FIG. 3 is a schematic diagram for explaining the basic arrangement of the first embodiment of the present invention;

FIG. 35 schematically shows map numbers and position coordinate corresponding to customer numbers employed in the first and second embodiments of the present invention; and FIG. 36 schematically represents map image data corresponding to the map number employed in the first and second embodiment of the present invention.

DETAILED DESCRIPTION OF THE PREFERRED EMBODIMENTS

Figure 4:
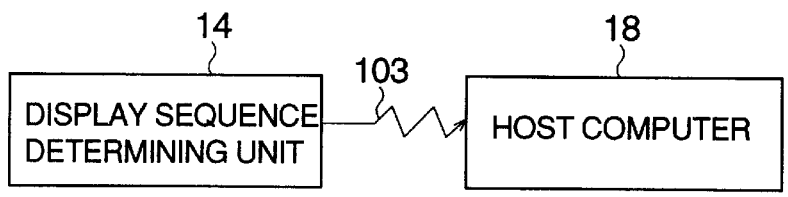
FIG. 4 is a schematic diagram for explaining the basic arrangement of the first embodiment of the present invention.

Referring now to schematic block diagrams of FIG. 6 and FIG. 7, a portable terminal apparatus according to a first embodiment of the present invention will be described.

[Summary of Embodiment 1]

The first embodiment is arranged by the block diagrams shown in FIG. 6 and FIG. 7 and is operated as follows: A map of destination is formed so that information about a counterpart can be correctly and effectively acquired, and also list information such as a content of contact and exhibition information is displayed on a screen display unit 34 based on the map information.

[Content of Embodiment 1]

[Information Display Unit]

In the information display unit shown in FIG. 1, the information inputted from the information input unit 10 displayed.

[Information Storage Unit]

In the information storage unit 39, the information required to make a layout of the destination map is stored together with the contract content information, or the personal information.

Here, such various data as the map data, the coordinate data, the address, name, and contract content data are stored in the information storage unit 39.

Examples this map of information unit include: a hard disk, a floppy disk, a random access memory (RAM), a read-only memory (ROM), a CD-ROM, an IC memory, and a magneto-optical disk.

[Information Reading Unit]

The information stored in the information storage unit 39 is read in the information reading unit 13.

[Display Sequence Determining Unit]

The display sequence of the information display unit 11 is determined based on the read signal read out from the information reading unit 13 in the display sequence determining unit 14.

[Portable Terminal Apparatus]

Figure 6:
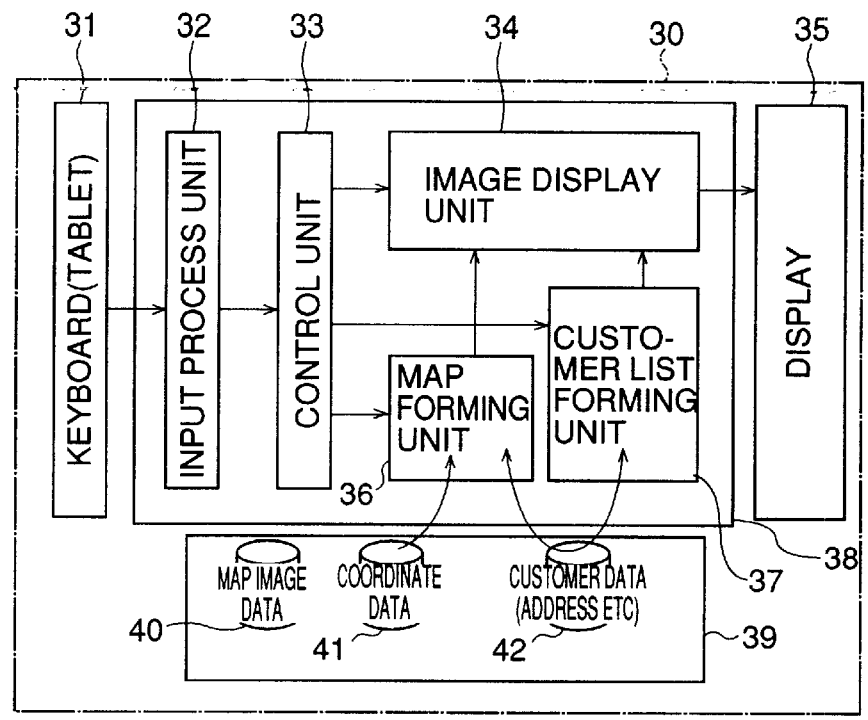
FIG. 6 schematically represents an overall arrangement according to the first embodiment of the present invention.

In the portable terminal apparatus, either the map data, or the contract data is display-processed by the arrangement shown in the block diagram of FIG. 6, for example.

According to a second invention, the map information input unit is constructed of the touch switch of the display screen.

[Map Information Input Unit]

The map information input unit 10 shown in FIG. 2 is arranged by the touch switch of the display screen.

The information input unit of this portable terminal apparatus may include such a device on which a touch switch of a display screen is provided.

For instance, the customer number, the coordinate data, the map data, and the contract data are entered by touching this touch switch with a pen, or a finger.

As this portable terminal apparatus, there are provided, for example, a pen input type computer, a notebook type personal computer, and a touch panel input type computer.

The information storage unit of this portable terminal apparatus may include a device constructed of a memory card. [Map Information Storage Unit]

The map information storage unit 12 shown in FIG. 3 is constructed with the memory card.

This memory card may include an IC card, or a magnetic card.

In an IC card, for instance, an IC memory is contained in a card-shaped storage medium, and can have a large storage capacity, as compared with that of a magnetic card and a floppy disk. As a result, map information is rewritable in this memory card.

Further, the display sequence determining unit 14 of this portable terminal apparatus may transmit the determined display sequence determining information via the data line 103 to the host computer.

For example, in case of business use, this host computer 18 is installed at a branch office, or a head (main) office.

[Display Sequence Determining Unit]

The display sequence determining unit 14 shown in FIG. 4 determines the display sequence of the map information display unit11 based on the read signal read out from the information reading unit 13.

A CPU is one example of this display sequence determining unit 14.

In a portable terminal apparatus, according to a second aspect of the present invention, equipped with an information processing unit for processing information such as image information, the portable terminal apparatus is comprised of:

an information input unit 10 for inputting map information of destination, either information about a content of contract, or personal information into said information processing unit;

an information display unit 35 for displaying the information entered from said information input unit 10;

an information storage unit 12 for storing the information displayed on said information display unit 35;

an information reading unit 13 for reading map information stored in said information storage unit 12;

a display sequence determining unit 14 for determining a display sequence based on a read signal sent from said information reading unit 13;

a display sequence determining information display unit 14 for displaying the display sequence determining information determined by said display sequence determining unit; and a designation unit for designating a visiting order with a top priority on a map displayed on said display sequence determining information display unit 14.

[Designation Unit]

Figure 5:
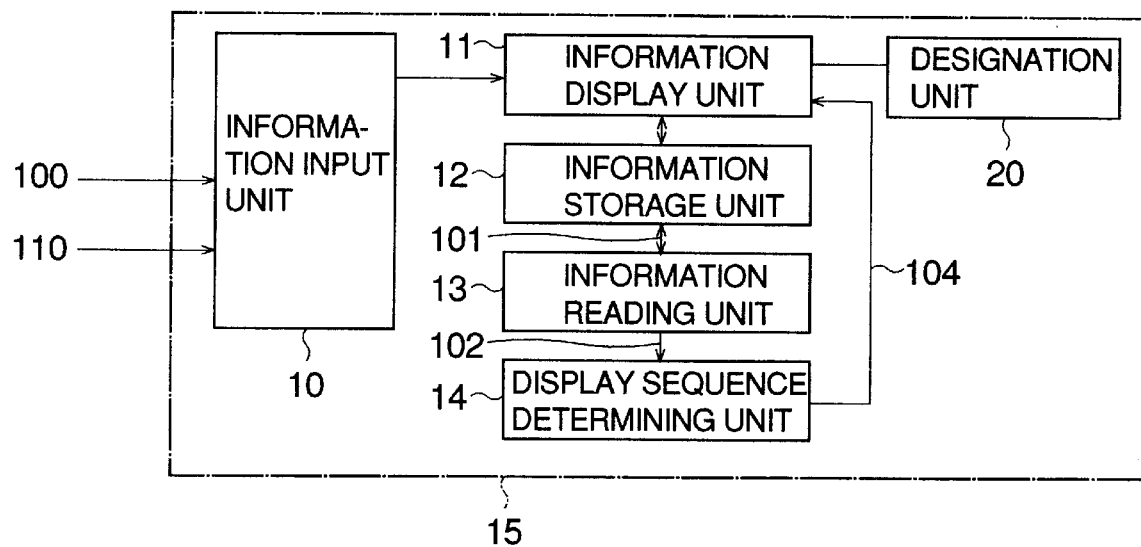
FIG. 5 is a schematic diagram for explaining the basic arrangement of the first embodiment of the present invention.

In the designation unit 15 shown in FIG. 5, a visit sequence is designated on the map shown in the map information display unit 35.

In this designation unit 15 for instance, the map information formed in the map forming unit is represented on the map information display unit 35, and the visiting sequence with a top priority is designated on this map in the order of the locations near the destination.

In the portable terminal apparatus, the information in the storage unit may include a register unit for registering the map position designated from the display screen of the display and the customer data in connection with the map position.

[Information Storage Unit]

The information storage unit 12 shown in FIG. 5 registers the map position designated from the display screen of the display and the customer data in connection with the map position.

Concretely, a storage hierarchical layer made of a hierarchical structure, and a cache memory are employed in the information storage unit 12.

In this portable terminal apparatus, the display sequence determining unit 14 may include a list display determining unit 14 for determining a representation of a customer data list in the designated visiting order.

[Display Sequence Determining Unit]

The display sequence determining unit 14 indicated in FIG. 5 determines how to display a list of customer data designated in the visiting order.

Figure 7:
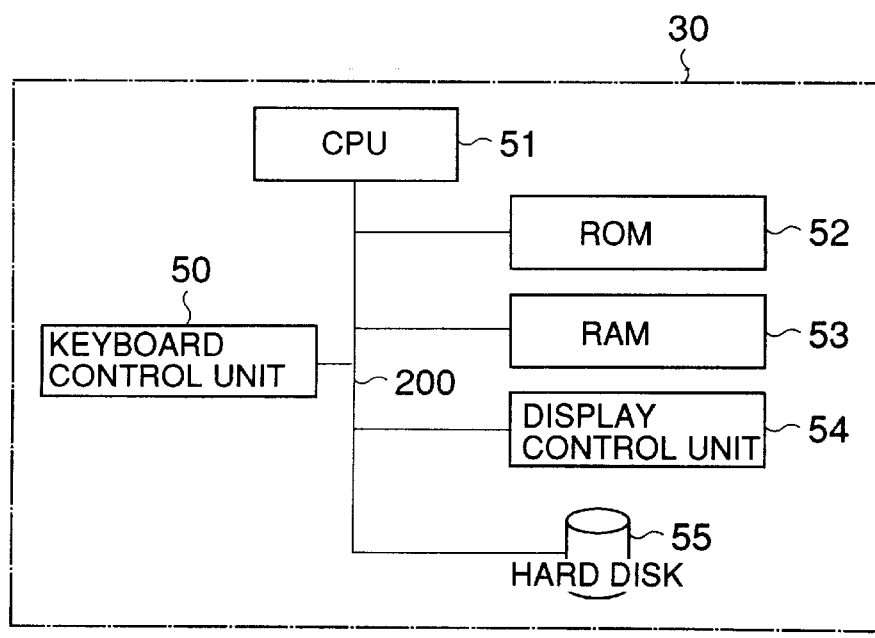
FIG. 7 is a schematic diagram used to describe the arrangement of the first embodiment of the present invention.

Further, in this portable terminal apparatus, the information display unit may include a designation display unit 14 for displaying the information on the map designated from a display screen of the display in accordance with the display sequence determined by the display sequence determining unitIn FIG. 6 and FIG. 7, the display process operation for the map data, or the contract map is carried out by the arrangement as shown in the block diagram of FIG. 6 in a portable terminal apparatus 30.

Examples of this portable terminal apparatus 30 include, for instance, a pen-entry type computer, a notebook-type personal computer, and a touch-panel-entry type computer.

Information 100 required to make a layout of an address position of a contractor on a map, and also information about a content of contract, or personal information 110 are inputted via a keyboard 31 into this portable terminal apparatus 30.

It should be noted that a digitizer may be used instead of the keyboard 31.

In the digitizer, position information (X and Y coordinates) can be entered by an operator by moving a pen or a cursor on a tablet.

An input processing unit 32 performs such a signal processing operation for converting the information 100 and the information about the contract content, or the personal information 110 into electrical signals. This information 100 is entered from the keyboard 31 and is required to made the layout of the address position of the contractor on the map.

A control unit 33 causes the screen display unit 34 and a map forming unit 36 to be operated in response to the input information converted into the electric signal by the input processing unit 32.

In this image display unit 34, the input information of the keyboard is displayed in response to the control signal derived from the control unit 33, and furthermore both of the map information and the customer list information, which have been formed in the map forming unit 36, or a customer list forming unit 37 are display-processed.

On a display 35, either the map information, or the customer information is displayed in response to the signal process output derived from the image display unit 34.

In the map forming unit 36, the map information is formed based on the coordinate data inputted from the keyboard 31 in accordance with a coordinate data file 41 of a data storage unit 39.

In the customer list forming unit 37, the customer list is formed based upon the customer data file of the data storage unit 39.

It should be understood that such customer information as address and names of customers is filed in the customer data file.

In a major circuit unit 38, the input processing unit 32, the control unit 33, the image display unit 34, the map forming unit 36, and the customer list forming unit 37 are arranged on a main board.

In the data storage unit 39, there are employed a map image data file 40, a coordinate data file 41, and a customer data file 42.

Map image data is written into this map image file 40, coordinate data corresponding to the address position of the customer is written into the coordinate data file 41, and furthermore, such customer data as addresses and names are written into the customer data file.

In the circuit block diagram of FIG. 7, a keyboard control unit 50 for controlling the keyboard 31 of FIG. 6 is connected via a bus line 200 to a central processing unit (CPU) 51 employed within the portable terminal apparatus 30.

As this CPU 51, a microprocessor is used.

To this CPU 51, a read-only memory (ROM) 52, a random access memory (RAM) 53, a display control unit 54, and a hard disk 55 are connected via bus lines, respectively.

The display control unit 54 controls the display process operation executed in the screen display unit 34 of FIG. 6.

An input/output control program and a process sequence program, used to form the map information, may be previously written into the ROM 52.

On the other hand, a program used for producing the map information is temporarily written into the RAM 53.

Furthermore, the customer data and the map data, the capacities of which are relatively large, used to form the map information are written into the hard disk 55.

Figure 34:
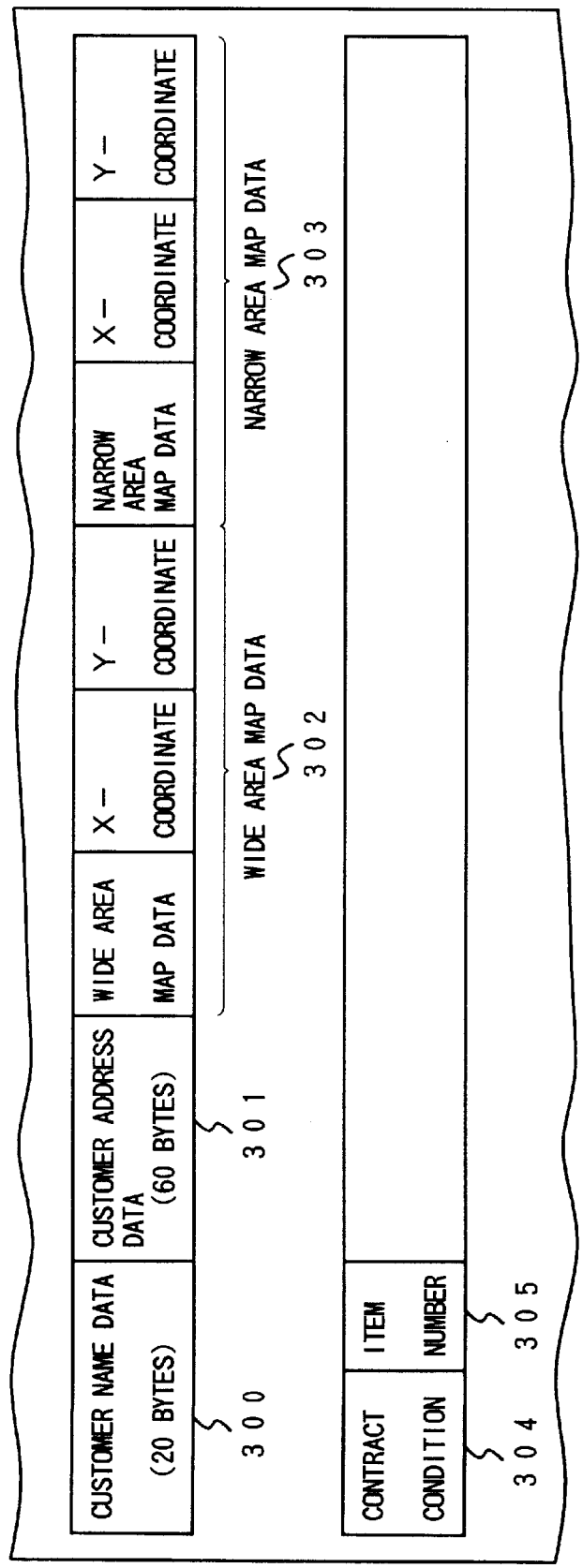
FIG. 34 schematically indicates customer data examples in the first and second embodiments of the present invention.

In FIG. 34, there is shown an example of a customer data format.

In FIG. 34, customer name data 300 is constructed of 20 bytes. This customer name data 300 corresponds to data about a name of a customer to be visited.

Customer address data 301 is constructed of 60 bytes. This customer address data 301 represents an address for a visit.

Further, both wide area map data 302 and narrow area map data 303 will now be explained.

In this specification the wide area map data 302 implies map information about a wide range, for instance, map data concerning Otemachi 1-chome, Chiyodaku, Tokyo.

Also, the narrow area map data 303 implies map data made by subdividing the wide area map information concerning, for instance, Otemachi 1-chome 10-banchi, Chiyodaku.

In other words, a relationship between the wide area map data 302 and the narrow area map data 303 is understood as such that the data made by subdividing the wide area map data 302 corresponds to the narrow area map data 303.

The wide area map data 302 is constructed of wide area map number data for representing, for example, which area is located in a town, and X-coordinate data on a town map, and also Y-coordinate data on this town map.

The narrow area map data 303 is constructed of narrow area map number data for indicating which area is located in a certain address, and X-coordinate data on an address map, and also Y-coordinate data on this address map.

On the other hand, contract condition data 304 corresponds to such data for indicating whether or not a customer has made a contract. For instance, when the customer has not yet made the contract, this data is expressed by "0", whereas when the customer has already made the contract, this data is expressed by "1".

Item number data 305 corresponds to such data indicative of a visiting order of customers. For instance, this visiting order may be determined as 1st, - - - , 10th by an operator in accordance with such a condition that the customer who is located at the nearest place from the operator is the first visiting order.

Figure 8:
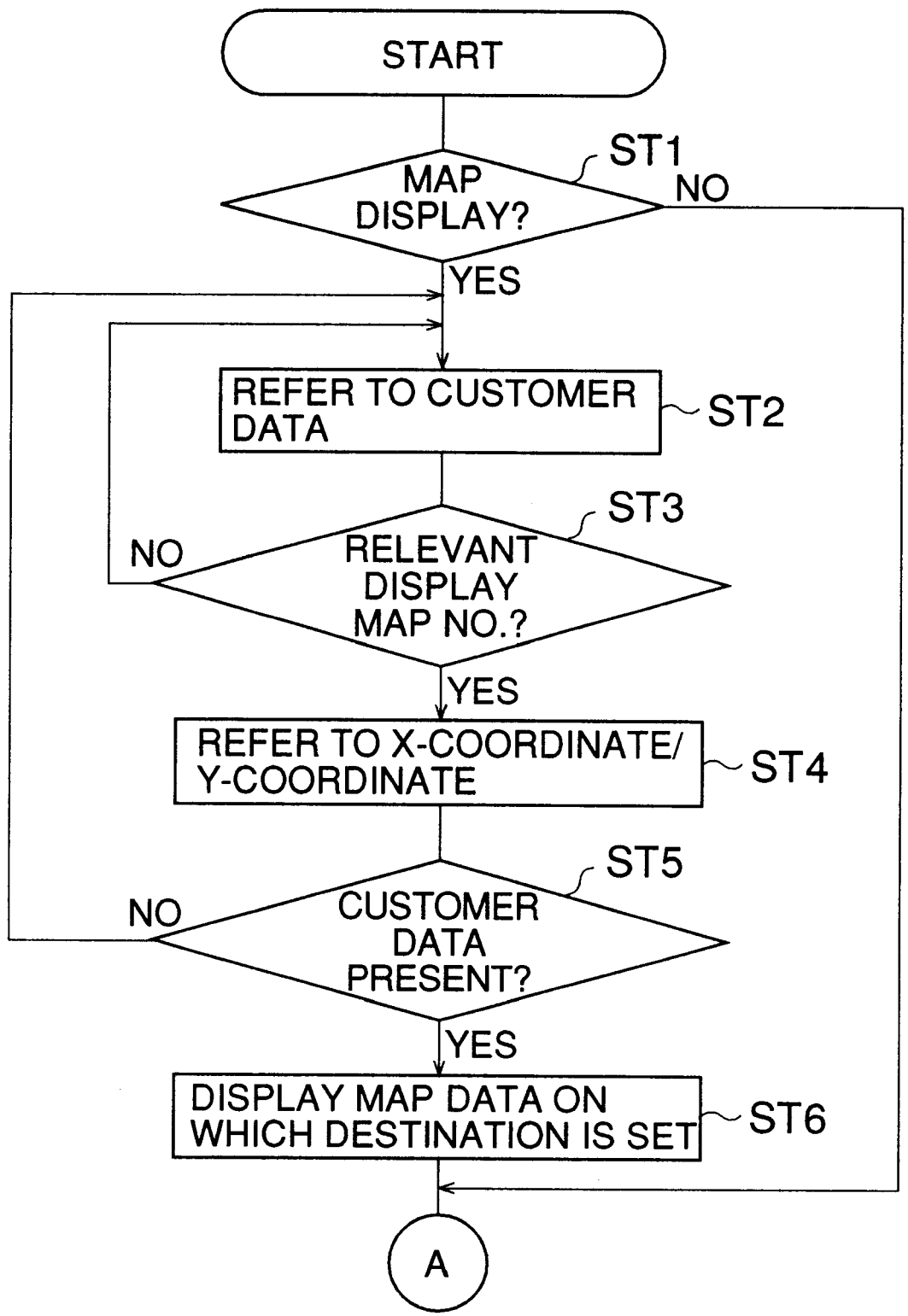
FIG. 8 is a flow chart for explaining a portion of the map data display process executed in the portable terminal apparatus according to the first embodiment of the present invention.
Figure 9:
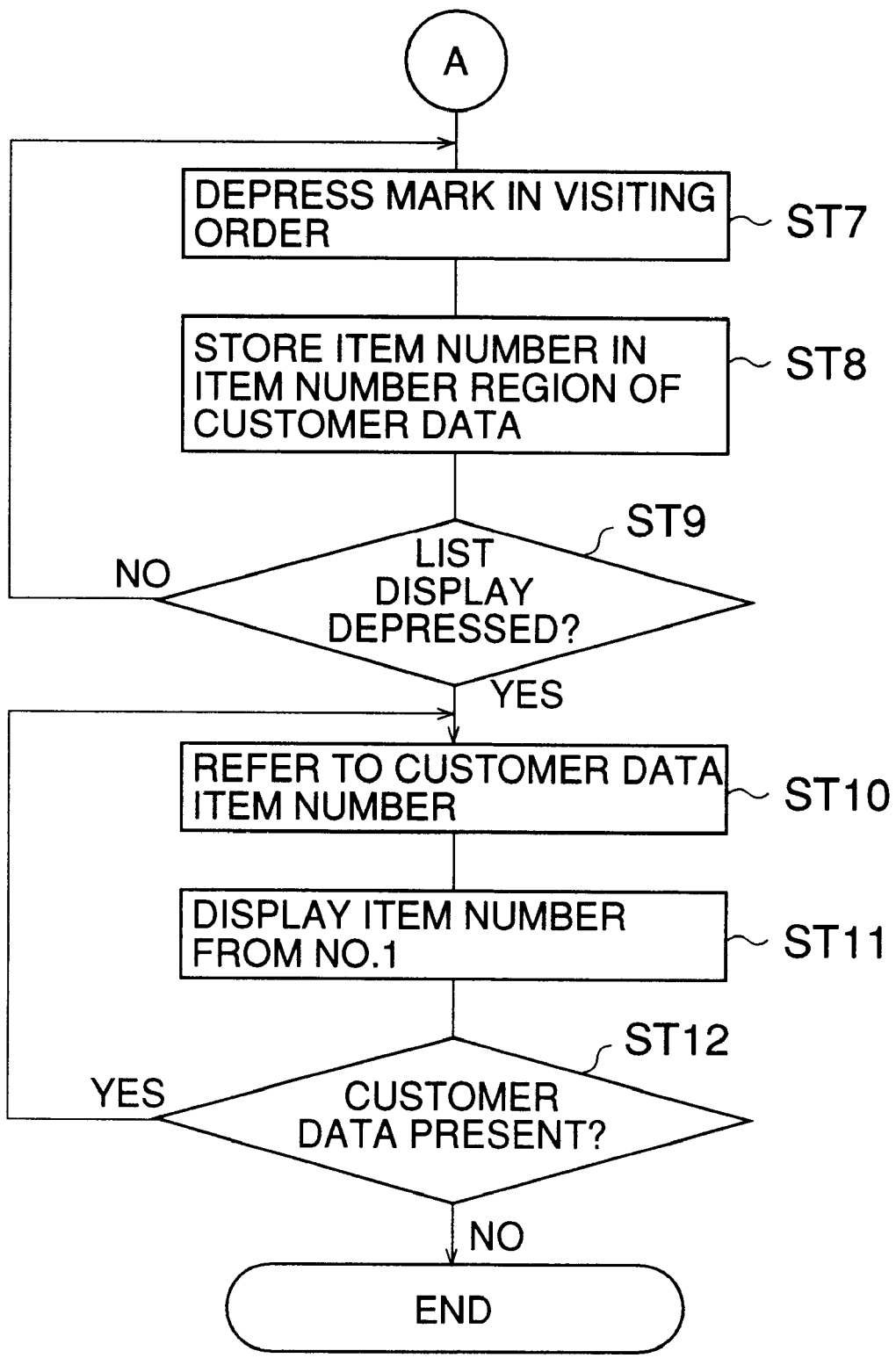
FIG. 9 is a flow chart for explaining a portion of the map data display process executed in accordance with the first embodiment of the present invention.

[Operation Flow Chart of First Embodiment]
[Summary of Process Operations in FIG. 8 and FIG. 9]

This process operation quickly defines a position of a customer to be visited on a map.

[Contents of Process Operations in FIG. 8 and FIG. 9]

FIG. 8 and FIG. 9 are flow charts for explaining a process sequence to display the map data on the display screen.

A description will now be made of the operation flow charts shown in FIG. 8 and FIG. 9 with reference to the circuit arrangements indicated in FIG. 6 and FIG. 7.

Before performing the process operation shown in FIG. 8, such an environment is set by storing image data about a range of a certain defined map, and map coordinate data into the data storage unit 39 of the portable terminal apparatus 30 shown in FIG. 6. Accordingly, this program is brought into the operable condition.

In this case, a format of the customer data is indicated in a data format of FIG. 34.

Next, in the map forming unit 36 of the portable terminal apparatus 15 shown in FIG. 6, the customer data having the map number corresponding to the map number of the map to be displayed is retrieved from the customer data file 42, and a decision is made at which place in the image, the position of the customer is located based on the X-coordinate data and the Y-coordinate data.

A decision as to which place of the map image, the position of the customer is located in is performed by the map forming unit 36.

At this time, a map display instruction is issued by operating a map display button 35d (shown in FIG. 16) of the display 35 indicated in FIG. 6 by the operator of the portable terminal apparatus 15.

Figure 13:
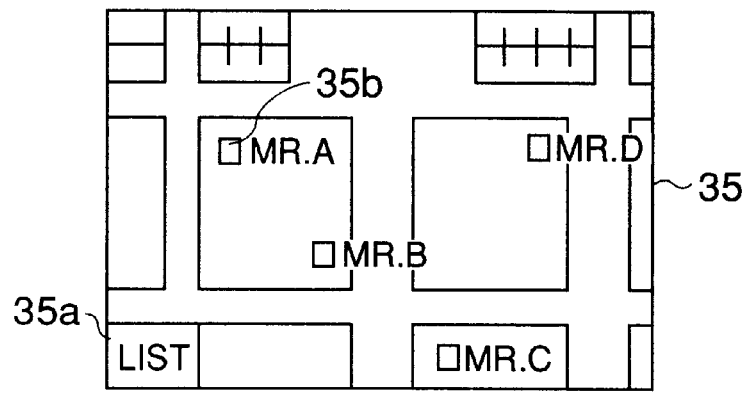
FIG. 13 schematically illustrates an example of map data displayed in the portable terminal apparatus according to the first embodiment of the present invention.

When this map display button 35d is depressed by way of the operator's operation of the portable terminal apparatus 15, a judgement is made in the portable terminal apparatus 15 as to whether or not a mark 35b of FIG. 13 capable of directly designating the customer at the address position of the customer, can be displayed on the display together with the image data about the map (step 1).

In other words, this portable terminal apparatus 15 can judge whether or not such customer data as an address and a name of a customer is present at the address position designated by the customer in question.

When it is so judged that the mark 35b of FIG. 13 can be represented on the display in the portable terminal apparatus 15 (YES of step 1), the customer data such as the address and name of this customer are referred (step 2).

Figure 14:
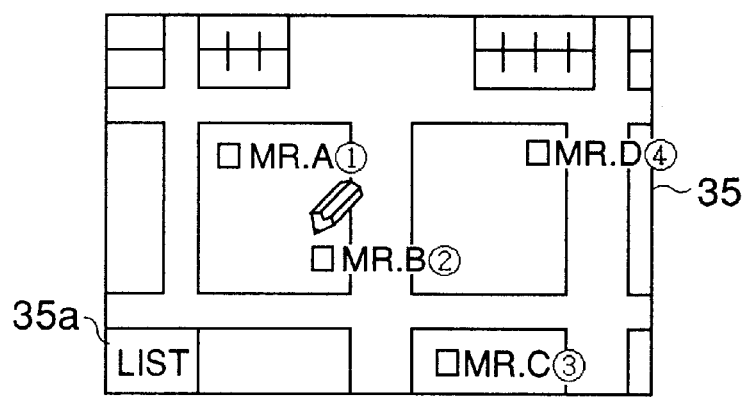
FIG. 14 schematically shows another display example of the map data according to the first embodiment of the present invention.

When, for example, as represented in the display 35 of FIG. 14, the address positions of MR. A to MR. D are designated in response to the designation instruction issued by the operator of the portable terminal apparatus 15 and the map display button 35d of FIG. 16 is depressed by the operator, the customer data designated on the map is stored into the corresponding memory region.

Figure 16:
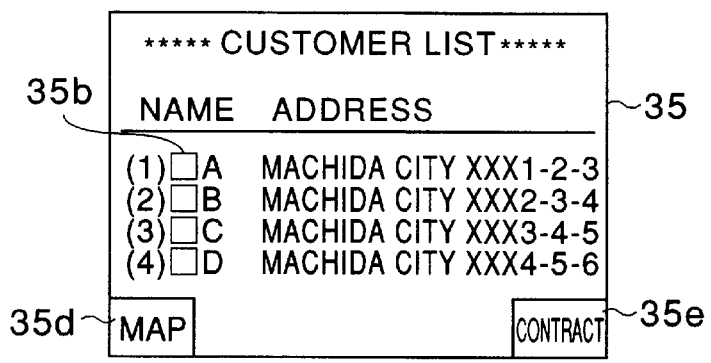
FIG. 16 schematically shows another display example of the map data according to the first embodiment of the present invention.

On the other hand, the customer data which is not designated on the map, namely the region of the item number 305 shown in FIG. 34 is empty, assuming now that the display instruction is issued to the customers who are not designated, both the names and addresses of the customers shown in FIG. 16 are represented.

Then, in the customer list forming unit 17 shown in FIG. 6, a customer list is formed based on the item number data indicative of the visiting order of the region. This region has such an item number 305 for representing the visiting order of the customers who are visited.

For example, the item number data is designated in such a manner that the customer located at the shortest distance from a certain point corresponds to MR. A, namely a first visit, and the next shortest customer is MR. B, namely a second visit. Then, the visiting order is determined with reference to this item number data, and a list of these customers is displayed in this order.

In this customer list forming unit 17, since the operator designates the item number data and determines the visiting order with reference to this item number data, the visiting order can be effectively defined.

After referring to the customer data, a display control unit 54 is made as to whether or not the customer data corresponds to the number of displayed map (step 3).

When it is so judged that the customer data corresponds to the number of displayed map (YES of step 3), the process operation refers to the X ordinate and the Y ordinate of the displayed map (step 4).

Conversely, when it is so judged that the customer data does not correspond to the number of displayed map (NO of step 3), the reference operation is again performed about the X coordinate and the Y coordinate of the displayed map for the next customer data at the step 2.

At a step 4, after referring to the X coordinate and the y coordinate of the displayed map, a check is done as to whether or not the map data concerning a desired customer is displayed in these coordinates (step 5).

When the operator judges that the desired customer data is displayed (YES of step 5), the map data in which the customer to be visited has been set is displayed on the screen (step 6).

After the map data in which the customer to be visited has been set is displayed, the mark is depressed by the operator in accordance with the visiting order (step 7).

It should be noted that when it is so judged at the previously explained step 1 that no map is displayed (NO of step 1), the process operation defined at the step 7 is executed.

When the mark is depressed by the operator in the visiting order, the item number information corresponding to the visiting order of the customer data is stored in the memory in correspondence with the depressed order (step 8).

After the item number information of the customer data has been stored into the memory, the customer list forming unit 37 is made as to whether or not the list display button of the display 35 is depressed by the operator (step 9).

When the list display button of the display 35 is depressed (YES of step 9), the process operation refers to an item number 305 indicative of the visiting order of the customer data shown in FIG. 34 (step 10).

To the contrary, when it is so judged that the list display button of the display 35 is not depressed by the operator of the portable terminal apparatus 15 (NO of step 9), the process operation defined at the step 7 is again executed.

After referring to the item number 305 indicative of the visiting order of the customer data, a display is made of the item numbers, for example, from the item number 1 (step 11).

After the item numbers from this item number 1 have been displayed, a check is done as to whether or not the next customer data is present (step 12).

In case when it is so judged that no next customer data is present (NO of step 12), the above-described process operations are completed.

When it is judged that the next customer data is present (YES of step 12), such a process operation for referring to again the item number indicative of the visiting order of the customer data at the step 10 is carried out.

In accordance with the first embodiment, based upon the map information displayed on the display 35, the customer visiting order is designated via the designating unit 19 of the portable terminal apparatus 15 by the operator in the map forming unit 36 and the customer list forming unit 37.

In this designating unit 19, the list of the customer information such as the names and addresses of the respective customers can,be displayed by designating the visiting order by the operator, for example, a first visit to MR. A, a second visit to MR. B, and a third visit to MR. C'.

Also, in the designating unit 19, the visit mark is designated by the operator, for instance, when MR. D is visited, the designation of the visit mark is represented, so that a list for the next newly visiting customers can be displayed, and then a map of this next visiting customer designated by this mark can be displayed.

Figure 10:
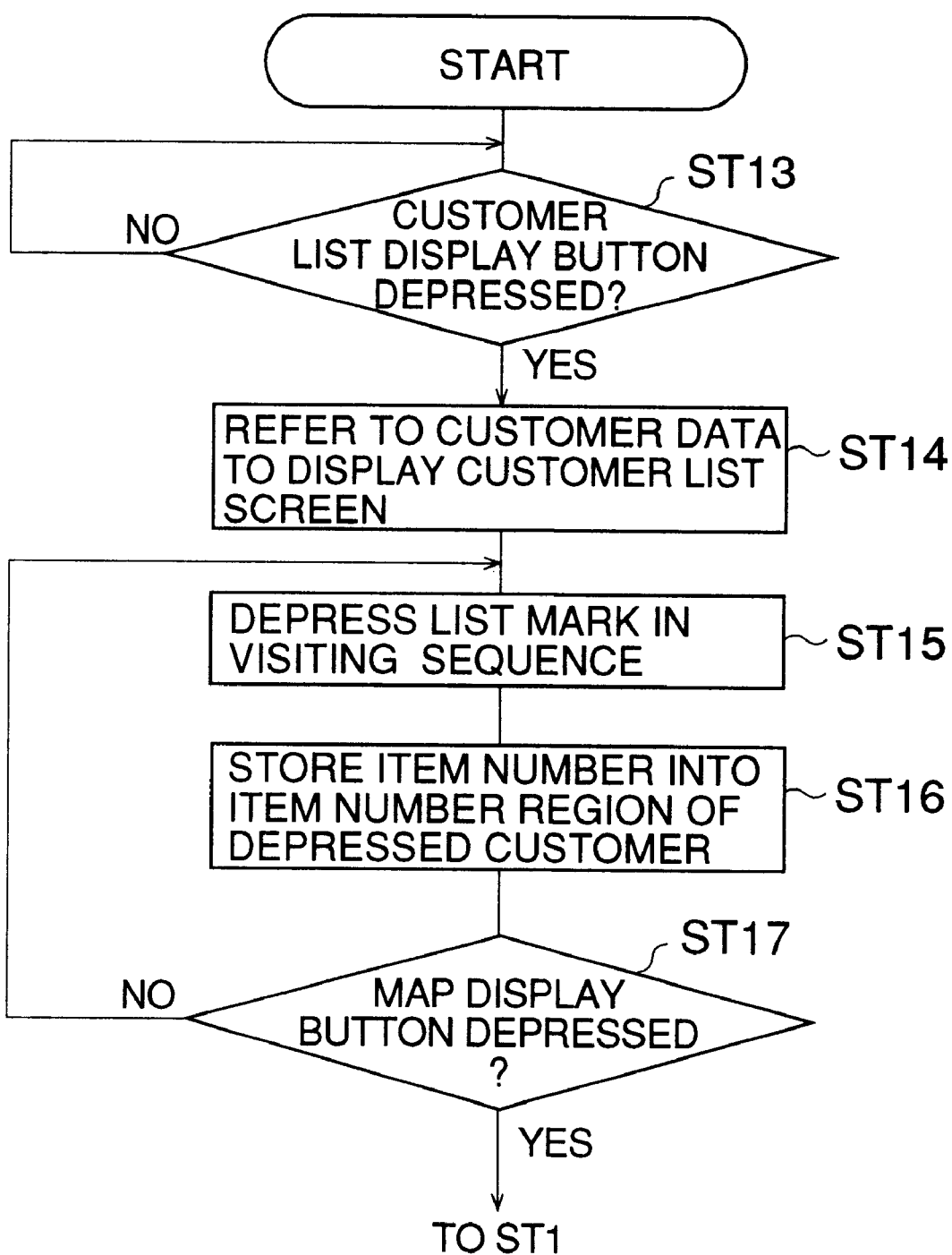
FIG. 10 is a flow chart for explaining a portion of the map data display process executed in accordance with the first embodiment of the present invention.

[Summary of Process Operation of FIG. 10]

In accordance with this process operation, the map display can be effectively performed in the visiting order by storing the visiting order into the item number region of the customer selected from the list screen of the customer to be visited, and then by reading the item number of this visiting order.

[Content of Process Operation in FIG. 10]

In the process operation of FIG. 10, a judgement is made as to whether or not the operator depresses the customer list display button of the display in order to display the customer list (step 13).

In case that the operator depresses the customer list display button 35a (YES of step 13), the process operation refers to the customer data and the customer list screen is displayed (step 14).

After the customer list screen is represented on the display, the list display button 35a is depressed in the visiting order (step 15).

After the customer list display button 35a is depressed in the visiting order, the item number is stored into the item number region indicative of the visiting order of the depressed customer (step 16).

After the item number has been stored into the item number region of the customer, a check is done as to whether or not the map display button 35d on the display is depressed (step 17).

When the map display button 35d is depressed (YES of step 17), the process operation jumps to the previously described step 1 shown in FIG. 8 at which the judgement of this step is again carried out.

It should be noted that when it is so judged at the step 13 that the operator does not depress the customer list display button 35a on the display (NO of step 13), the judgement defined at the step 13 is again performed.

At the step 17, when the map display button 35d is depressed (NO of step 17), the process operation defined at the step 15 is executed.

In the above-described process operations defined from the step 13 to the step 17, the item number data is stored into the item number region in the visiting order of the customer, and this item number data is read out, so that the maps can be quickly displayed in the visiting order.

Figure 11:
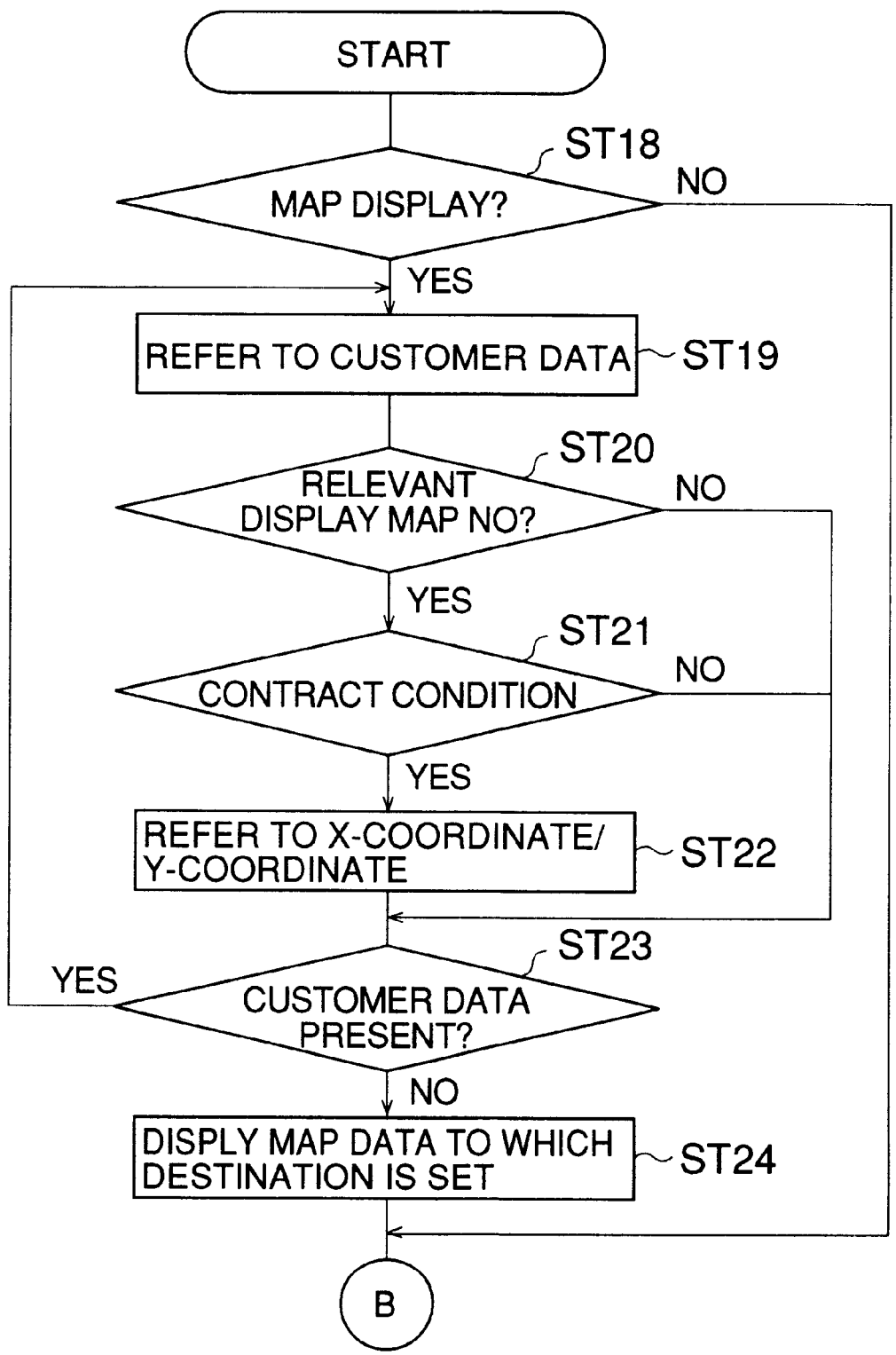
FIG. 11 is a flow chart for explaining a portion of the map data display process executed in accordance with the first embodiment of the present invention.
Figure 12:
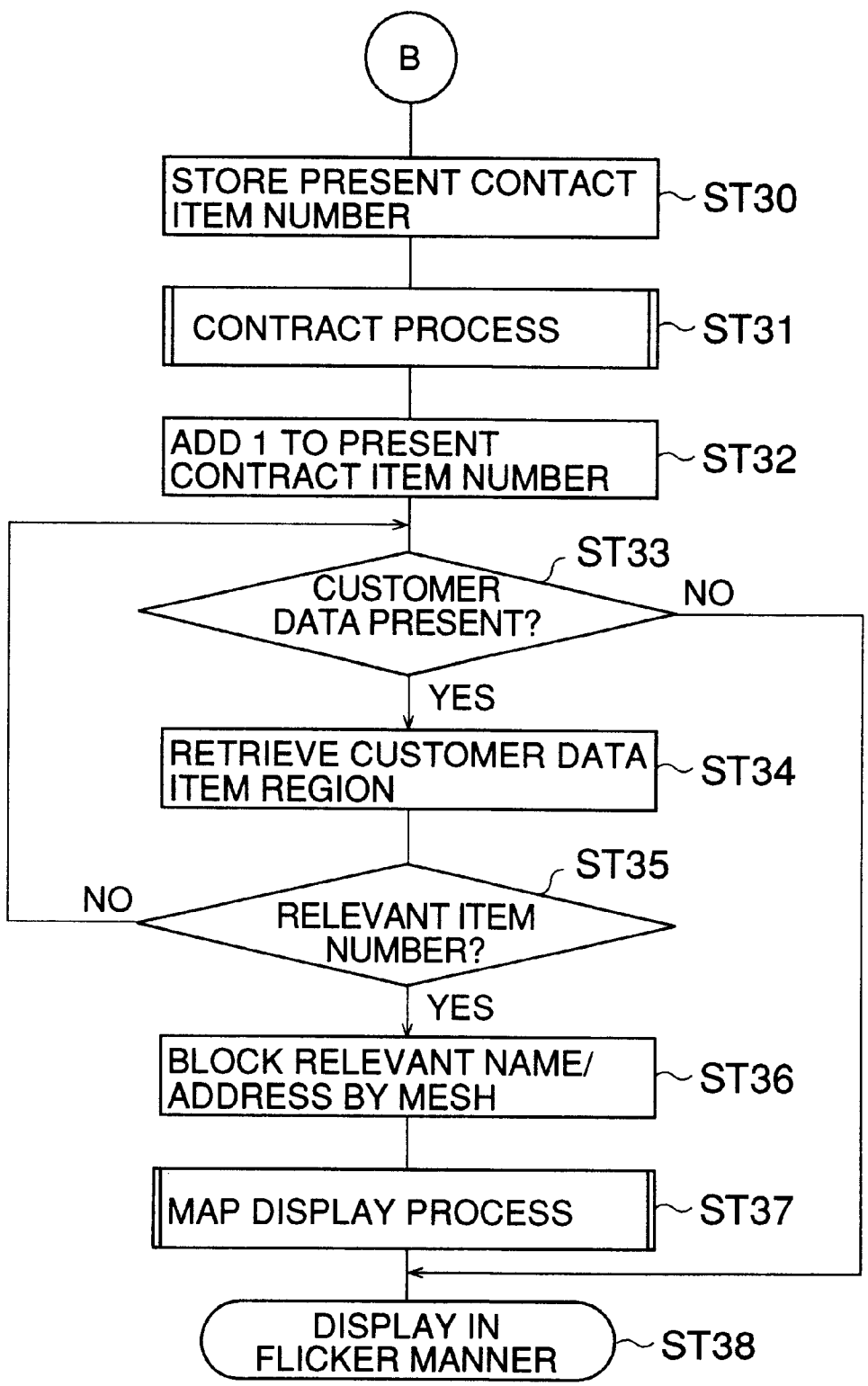
FIG. 12 is a flow chart for explaining a portion of the map data display process executed in accordance with the first embodiment of the present invention.

[Summary of Process Operations of FIG. 11 and FIG. 12]

In this process operation, a customer who will be visited is represented on the map, and then a judgement can be made quickly as to whether or not this customer has already made a contract.

[Content of Process Operations of FIG. 11 and FIG. 12]

Next, a description will now be made of the display process operation of the map data defined in the flow charts of FIG. 11 and FIG. 12.

In FIG. 11, a check is first made as to whether or not the map is displayed (step 18).

When the map is displayed (YES of step 18), the process operation refers to the customer name data 300 of the customer data shown in FIG. 34 so as to specify a desired customer (step 19).

After the desired customer is specified, the operator judges whether or not it is the customer address data 301 corresponding to the map number to be displayed (step 20).

When it is the customer address data 301 corresponding to the map number to be displayed (YES of step 20), the operator performs such a judgement as to whether or not contact condition data 304 shown in FIG. 34 is presented in this customer address (step 21).

In case that the contact is made (YES of step 21), for instance, the process operation refers to the X coordinate and/or the Y coordinate of the map information in the data storage unit 39 (step 22).

After referring to the X coordinate and/or the Y coordinate of the map information, a CPU 51 is checked as to whether or not it is coincident with the customer name data 300 of the desired customer data present at this coordinate position (step 23).

When it is not coincident with the customer name data 300 of the desired customer data (NO of step 23), such a map that the visit destination is designated at the coordinate position designated by the customer data by way of the mark is displayed (step 24).

It should be noted that when it is so judged at the above-described step 18 that the map is not displayed (NO of step 18), another display process operation defined in FIG. 12 is carried out (will be described).

When it is so judged at the step 20 that it does not correspond to the map number to be displayed (NO of step 20), and also it is judged at the step 21 that there is no contract item number indicative of the contract condition (NO of step 21), another judgement is performed as to whether or not the customer data of step 23 is coincident with preset customer data.

Furthermore, at the step 23 if there is the customer data (YES of step 23), then the process operation again refers to the customer data at the step 19.

In the display process operation of FIG. 12, the present contact condition is temporarily written into the RAM of the data storage unit 39 shown in FIG. 6 (step 30).

Then, after the present contact condition has been temporarily stored into the RAM of the data storage unit 39, the content of the contract is processed in accordance with a subroutine process (step 31).

Subsequently, when the present contract is completed, the contract condition is rewritten from "0" to "1", so that the contract item number indicative of the contract condition is updated (step 32).

After the contract item number representative of the present contact condition is updated, a check is done as to whether or not the next customer data is present (step 33).

When there is the next customer data (YES of step 33), the item number data of the visiting order for the next customer data is retrieved (step 34).

After the item number data unit of the customer data is retrieved, a CPU 51 determines whether or not the retrieved item number data corresponds to the item number data indicative of the visiting order for the specific customer (step 35).

When it is so judged that the retrieved item number data corresponds to the item number data about the visiting order of the specific customer (YES of step 35), the relevant name and address are displayed in a mesh shape (step 36).

After the relevant name and address have been displayed in the mesh shape, a map display process operation is executed in accordance with a subroutine process (step 37).

Figure 17:
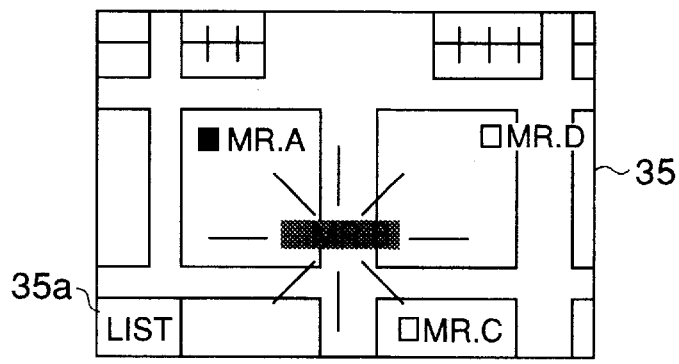
FIG. 17 schematically shows another display example of the map data according to the first embodiment of the present invention.

After the execution of the map display process operation in accordance with the subroutine process, for instance, the map position of MR. B shown in FIG. 17 is displayed in a flashing manner (step 38).

It should be understood that the map is represented by depressing the map button 35d shown in FIG. 16 by the operator.

At this time, since the marks are attached on the customers who have already established the contract and the name of the customer who will be subsequently visited is displayed in the flicker manner, they can be readily, and visually recognized.

Figure 18:
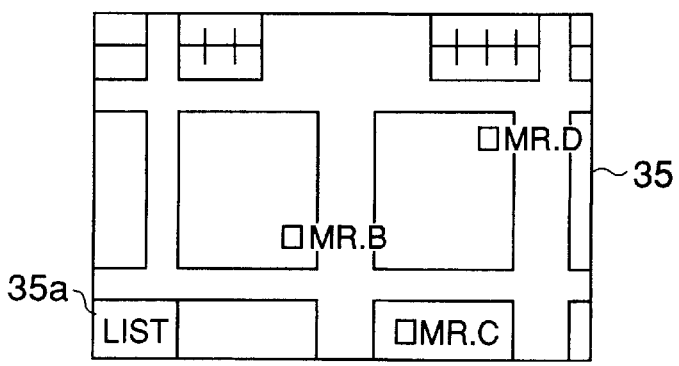
FIG. 18 schematically shows another display example of the map data according to the first embodiment of the present invention.

When the map button 35*d* is depressed by the operator to represent such a map as shown in FIG. 18, the customers who have already made the contract can be erased from the map.

In accordance with the above-explained process operations defined from the step 18 to the step 38, the customer who will be visited is displayed on the map and such a judgement as to whether or not this customer has already made the contact can be quickly carried out.

[Samples of Display Screen]

Samples of display screens will now be explained with reference to FIG. 13 to FIG. 25.

At this time, the reference is made of the block diagrams shown in FIG. 6 and FIG. 7.

First, a list button 35*a* is represented on the display 35 shown in FIG. 13, and a designation 35*b* of address positions for MR. A to MR. D.

The image data on a certain defined region, the map coordinate data, and the customer data are stored in the data storage unit 39 of the terminal apparatus 30.

In this case, the format of the customer data is the previously explained customer data format in the list 1.

The map forming unit 36 of the terminal apparatus 30 shown in FIG. 6 retrieves the customer number and determines which place of the map image, the position of the customer is located at based on the X coordinate data and the Y coordinate data.

Subsequently, when the list display button 35*a* of the map display is depressed by the operator as represented in FIG. 14, such a customer designation button 35*b* capable of directly designating the customer at the address position of the customer can be displayed on the screen together with the image data of the map.

Next, the operator designates the mark portion on the display 35 of FIG. 14.

When the designation of the mark portion is ended on the display 35, the operator depresses the list display button 35*a* for forming the list and then the name/address of the customer data are displayed on the screen in the designated order on the map.

Figure 15:
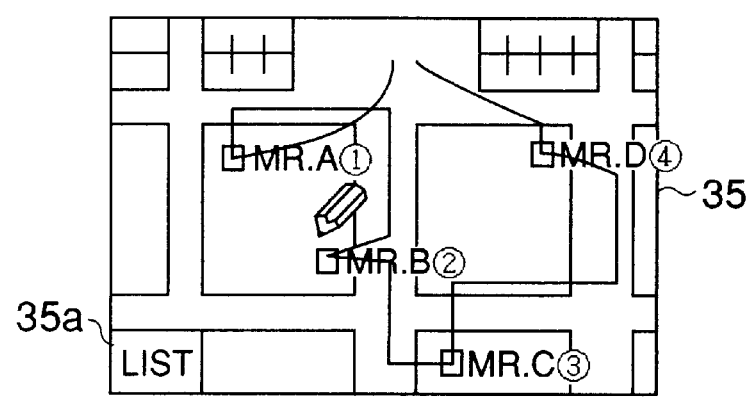
FIG. 15 schematically shows another display example of the map data according to the first embodiment of the present invention.

Also, a direct visiting route is drawn on the map indicated on the display 35 in FIG. 13, and the customer to be visited is marked as illustrated in FIG. 15.

To this end, the passing order is previously stored and this stored passing order must be reflected when being represented on the display 35.

When the list display button 35*a* for forming the list is depressed by the operator, the passing order of the customer data is previously stored in accordance with the item number so as to search the item number unit, and then the names are displayed in the visiting order.

It, should be noted that when the display button 35*d* of the map shown in FIG. 16 is again depressed, after the route traced on the map has been traced, such a data display as shown in FIG. 15 is made.

In the customer list forming unit 17 shown in FIG. 6, a customer list screen shown in FIG. 16 is represented based on the installed customer data.

At this time, either a button, or a mark 35*b,* capable of designating the order of the customer is displayed.

In other words, the operator directly depresses the marks in accordance with the visiting order with reference to the customer list screen.

When the button or the mark 35*b* of FIG. 16 is depressed, at the same time, the item numbers designated in accordance with the visiting order are stored respectively, which are designated in the item number unit of the customer data of the data storage unit 39 shown in FIG. 6.

Here, when the map display button 35*d* shown in FIG. 16 is depressed by the operator, the map forming unit 36 of FIG. 6 refers to the item number region of the customer data, and then the item number displayed in the list is displayed beside the mark of the address position for the customer shown in FIG. 14 by executing the process operation shown in FIG. 10.

At this time, when the operator designates the customer from the customer list screen formed in the above-described process operation and depresses the contract starting button 35*e* of FIG. 16, the contact of the designated customer is commenced.

When the contract is ended, "1" is stored into the contract condition unit 304 of the customer data shown in FIG. 34 in case of an engagement of the contract, whereas "0" is stored therein in case of non-engagement of the contract.

For example, when MR. A has made the contract, "1" is written into the contract condition unit 304, whereas when MR. B to MR. D have not yet made the contract, "0" is written into this contract condition unit 304.

Next, when the operator depresses the button 35*a* for displaying the map and the customer list screen, the region of the contract condition unit 304 for the customer data is searched.

After searching the region of the contract condition unit 304 for the customer data, when "1" (establishment of contract) is stored in the contract condition unit 304, the customer, for instance, MR. A is not indicated on the display 35 of FIG. 18.

That is to say, when "1" (engagement of contract) is stored in the contract condition unit 304, no customer is represented on the display 35, whereas when "0" (non-engagement of contract) is stored therein, the customer is indicated on the display 35.

This implies that MR. A has already made the contract, and only such customers who have not yet established the contract namely MR. B, MR. C and MR. D are indicated on the display 35. As a result, only the displayed customers are visited to effectively make the visits.

Figure 19:
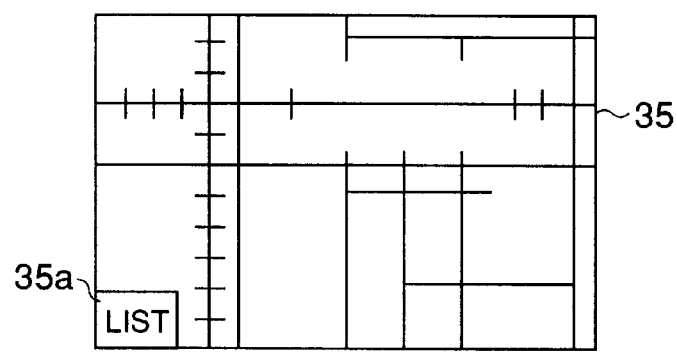
FIG. 19 schematically shows another display example of the map data according to the first embodiment of the present invention.

Next, to grasp the desirable visiting range on the display 35 shown in FIG. 19, the previously explained image data on the wide area map is displayed.

At this time, in order to further define the direct visit range, the region corresponding to the narrow area map is surrounded. For example, such a designation is made as a portion "A" surrounded by a circle of FIG. 20.

Figure 21:
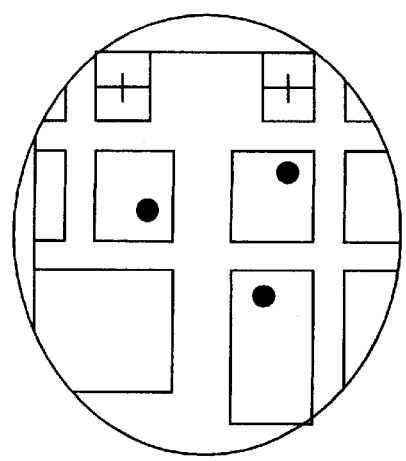
FIG. 21 is a schematic illustration for explaining an enlarged major portion "A" of the map data display shown in FIG. 20.

FIG. 21 shows an example in which this portion "A" is enlarged.

Figure 20:
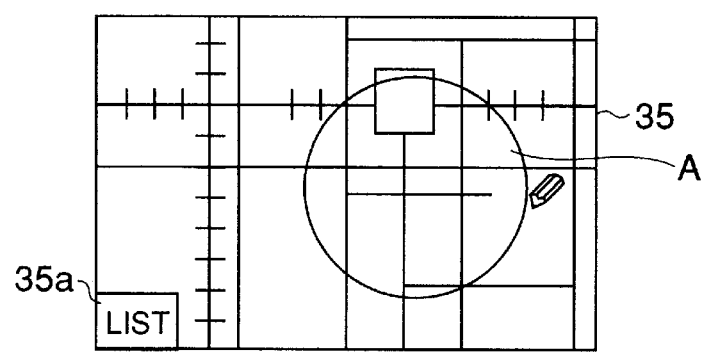
FIG. 20 schematically shows another display example of the map data according to the first embodiment of the present invention.

When the list display button 35*a* shown in FIG. 20 is depressed by the operator and subsequently the map display button 35*d* shown in FIG. 16 is depressed, the process operation refers to the X coordinate and Y coordinate about the wide area map data for the customer data.

At this time, when referring to the X coordinate and Y coordinate of the wide area map data for the customer data, namely when the list display button 35*a* of FIG. 20 is depressed, the customer list is displayed in accordance with the designated order.

Figures 22, 23:
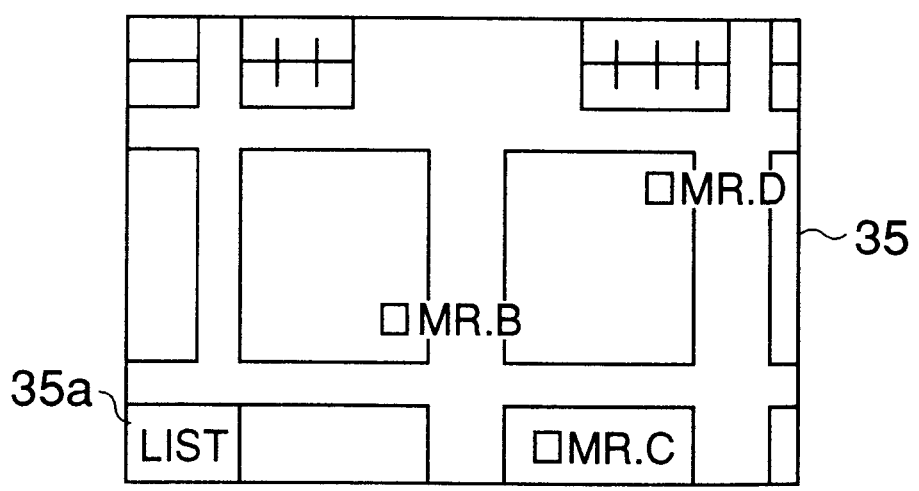
FIG. 22 schematically represents another display example of the map data according to the first embodiment of the present invention.
FIG. 23 schematically represents another display example of the map data according to the first embodiment of the present invention.

Also, when the map button 35*d* of the customer list screen on the display 35 shown in FIG. 22 is depressed, the narrow area map is displayed.

At this case, for instance, the customer who has made the contract is deleted from the map.

With the above-described display process, the easy-visiting order can be grasped from the list and the map at a first glance during the visiting business, so that such a visiting business can be effectively performed.

[Modification of Embodiment 1]

In accordance with a modification of the first embodiment, when a visit is paid for such a new customer whose map data and contract data are not provided, address/name data about such a new customer are stored into the data storage unit 39 shown in FIG. 6 by manipulating the keyboard by the operator.

Figure 24:
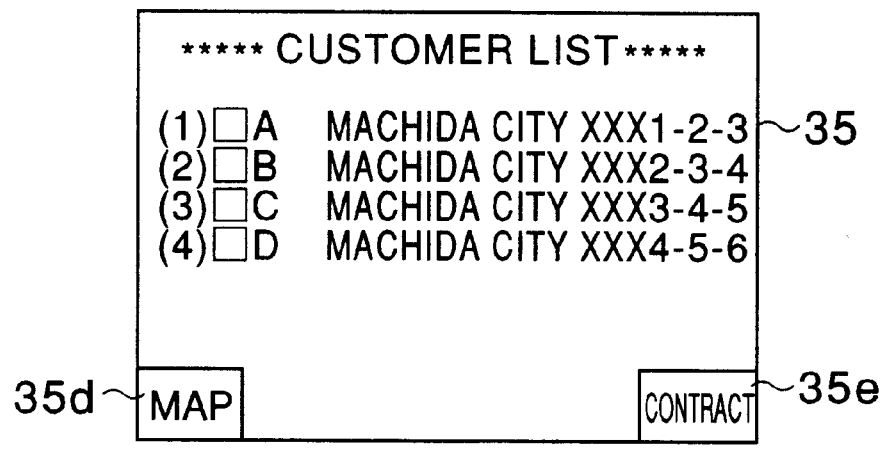
FIG. 24 schematically represents another display example of the map data according to the first embodiment of the present invention.

As a result, when the map data button 35d of the display 35 shown in FIG. 24 is depressed, this data may be originally displayed.

In FIG. 24 to FIG. 27, such a display process operation is illustrated.

When a visit is made to a new customer, such a display screen is represented on the display 35 of FIG. 24 and the contract button 35e is depressed to display the display screen during the engagement of contract.

Figure 25:
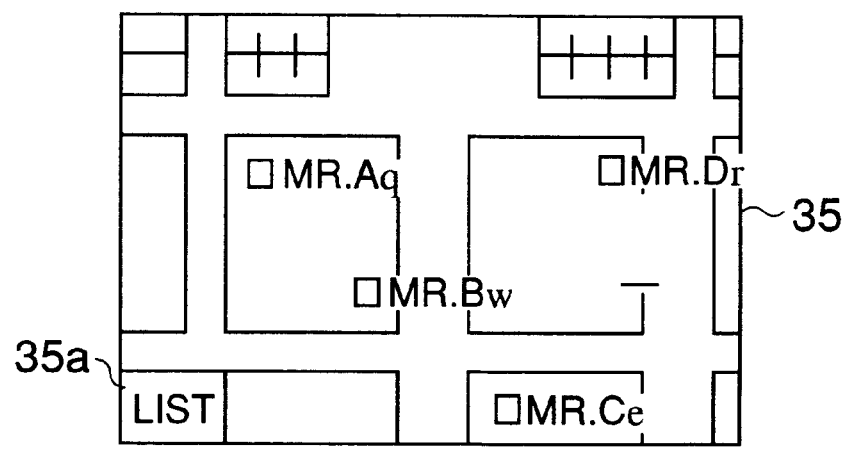
FIG. 25 schematically represents another display example of the map data according to the first embodiment of the present invention.

At this time, the map button 35d of FIG. 24 is depressed by the operator to represent a map as shown in FIG. 25.

When the map of FIG. 25 is displayed, the operator marks the position on the map corresponding to the address of the customer who has been visited and indicated on the map by a pencil mark of FIG. 25.

When the pencil mark is made on the map corresponding to the address of the customer who has been visited and displayed on the map, the portable terminal apparatus recognizes the marked coordinate position.

Figure 26:
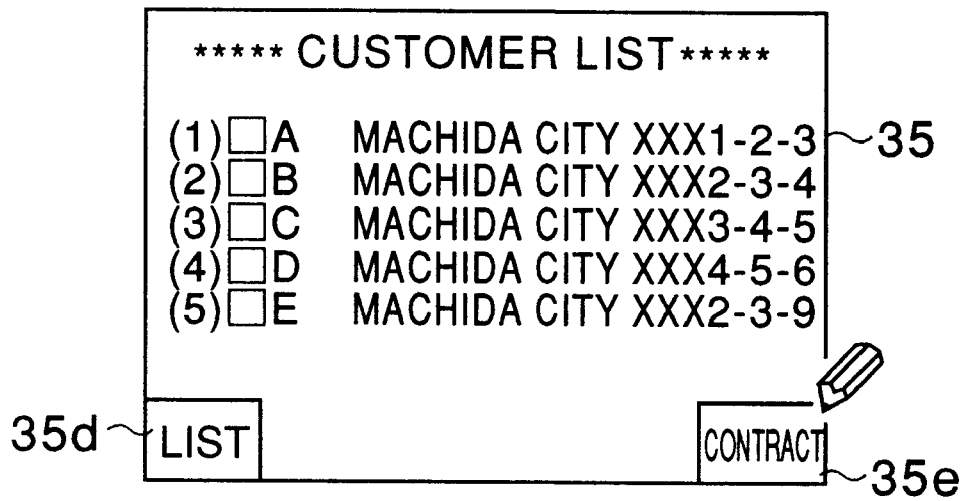
FIG. 26 schematically represents another display example of the map data according to the first embodiment of the present invention.
Figure 27:
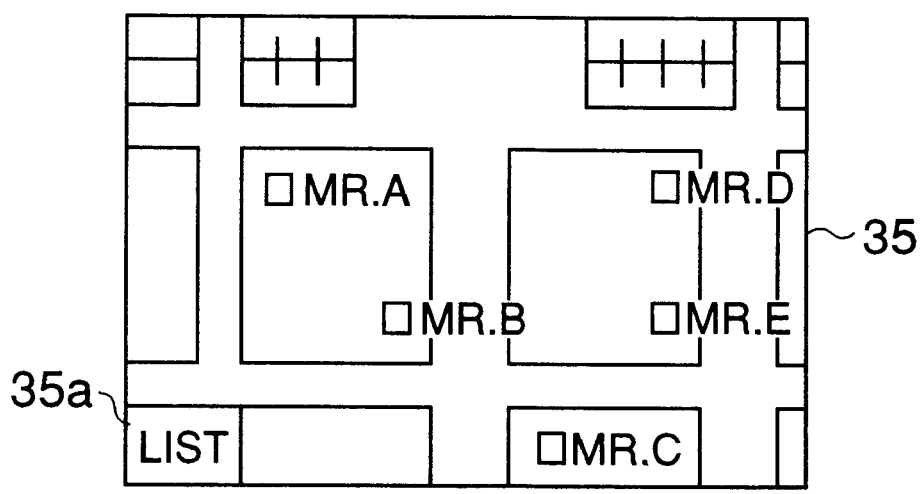
FIG. 27 schematically represents another display example of the map data according to the first embodiment of the present invention.

Next, when the list display button 35a on the display 35 of FIG. 27, a list of customers who will be newly visited is represented as in FIG. 26.

In other words, when the address and the name of the newly visited customer are inputted on the display screen of the newly visited customer list shown in FIG. 26 by depressing the contact button 35e on the display 35, for instance, the address of MR. E may be added.

After the address of MR. E has been added, the map position of the designated MR. E can be displayed by depressing the map button 35d shown in FIG. 26.

As a consequence, with respect to the customer visit business, the maps and the list are formed based on the customer data, so that these maps and list can be easily observed and the customer visit business can be effectively made. Furthermore, the new contract condition can be recognized at a first glance from both of the list and the map.

[Summary of Second Embodiment]

In accordance with a second embodiment, a position of visiting destination is set by way of a pen or a finger in the portable terminal apparatus, and then this data is entered into the host computer, so that the map data stored in the host computer can be quickly and firmly updated.

[Content of Second Embodiment]

Figure 28:
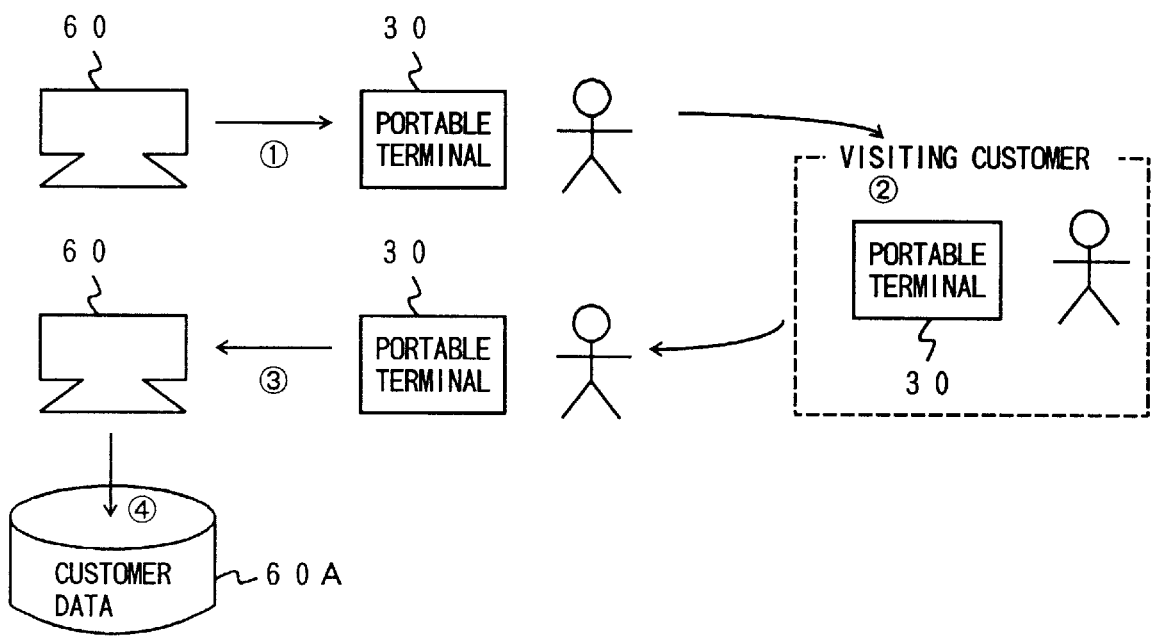
FIG. 28 is a schematic diagram for explaining an overall arrangement of a portable terminal apparatus according to a second embodiment of the present invention.
Figure 29:
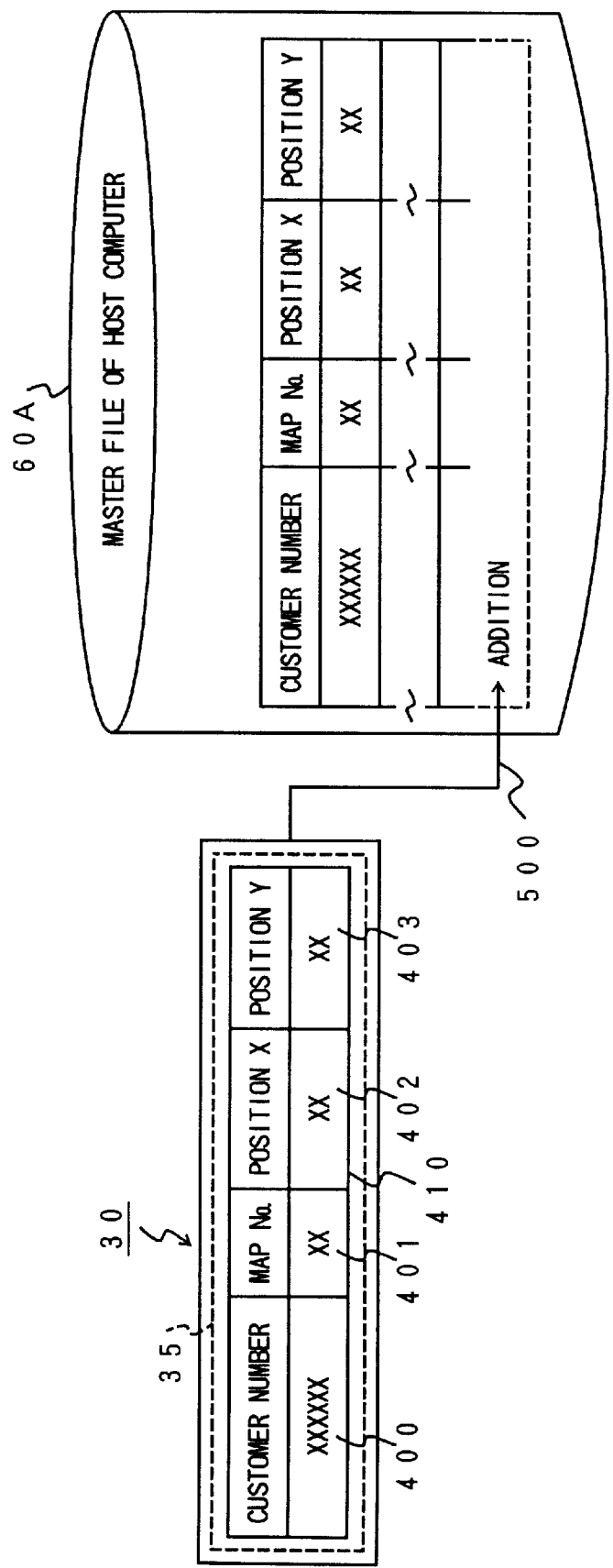
FIG. 29 is a schematic block diagram for describing the overall arrangement of the portable terminal apparatus according to the second embodiment of the present invention.

FIG. 28 is an explanatory diagram for explaining a content of this second embodiment. FIG. 29 is another explanatory diagram for representing that map information 410 stored in the portable terminal apparatus 30 is written into a file 60A of a host computer 60.

In this portable terminal apparatus 30, a display process operation of the map data, or the contract data is carried out by employing, for instance, the arrangement shown in the block diagram of FIG. 6.

As this portable terminal apparatus 30, there are, for example, a pen input type computer, a notebook type personal computer, and a touch panel input type computer.

The display screen of the display 35 shown in FIG. 6 may be constructed of a touch switch.

A customer number, coordinate data, map data, and contract data are entered by touching this touch switch with a pen, or a finger.

The customer information 410 stored into the data storage region of the portable terminal apparatus 30 shown in FIG. 29 is a customer number 400, a map number 401, positional coordinate X-coordinate data 402, and positional coordinate Y-coordinate data 403.

Since the customer number 400, the positional X-coordinate data 402 and the positional Y-coordinate data 403, and further the map data 401, or contract data (not shown) shown in FIG. 35 can be inputted by touching the touch switch provided opposite to the plane of the display 35 in this portable terminal apparatus 30, the operability thereof can be improved.

As represented in FIG. 29, the map information is transferred via a trunk line 500 to a computer 60 in this portable terminal apparatus 30.

It should be understood that a wire line, a wireless line, or a telephone line may be employed as this trunk line.

The computer 60 is such a computer provided at a branch office.

This computer 60 is further connected via a data line to a host computer (not shown) installed at a main office.

As a consequence, according to this second embodiment, the map information 410 of the portable terminal apparatus 30 is entered into the computer 60, so that the map information stored in a master file 60A of the computer 60 installed in the branch office can be updated. Moreover, the map information is supplied to the host computer of the main office from the computer 50 of the branch office, so that the customer information 410 of the portable terminal apparatus 30 and the customer data of the host computer are sequentially transferred to the computer 60, whereby the customer data can be updated.

Since such a cumbersome work to newly input the map information at the branch office and the main office can be omitted by employing this portable terminal apparatus 30, the map data can be quickly updated.

In addition, since the map information is no longer newly inputted at the branch office and the main office with employment of this portable terminal apparatus 30, such a map data input mistake that may happens to occur at the branch office and the main office can be avoided.

[Concrete Process Operation of Second Embodiment]

FIG. 30 to FIG. 33, are flow charts for explaining process operations of the portable terminal apparatus according to the second embodiment of the present invention. A detailed description will now be made of the flow operation with reference to FIG. 29.

Figure 30:
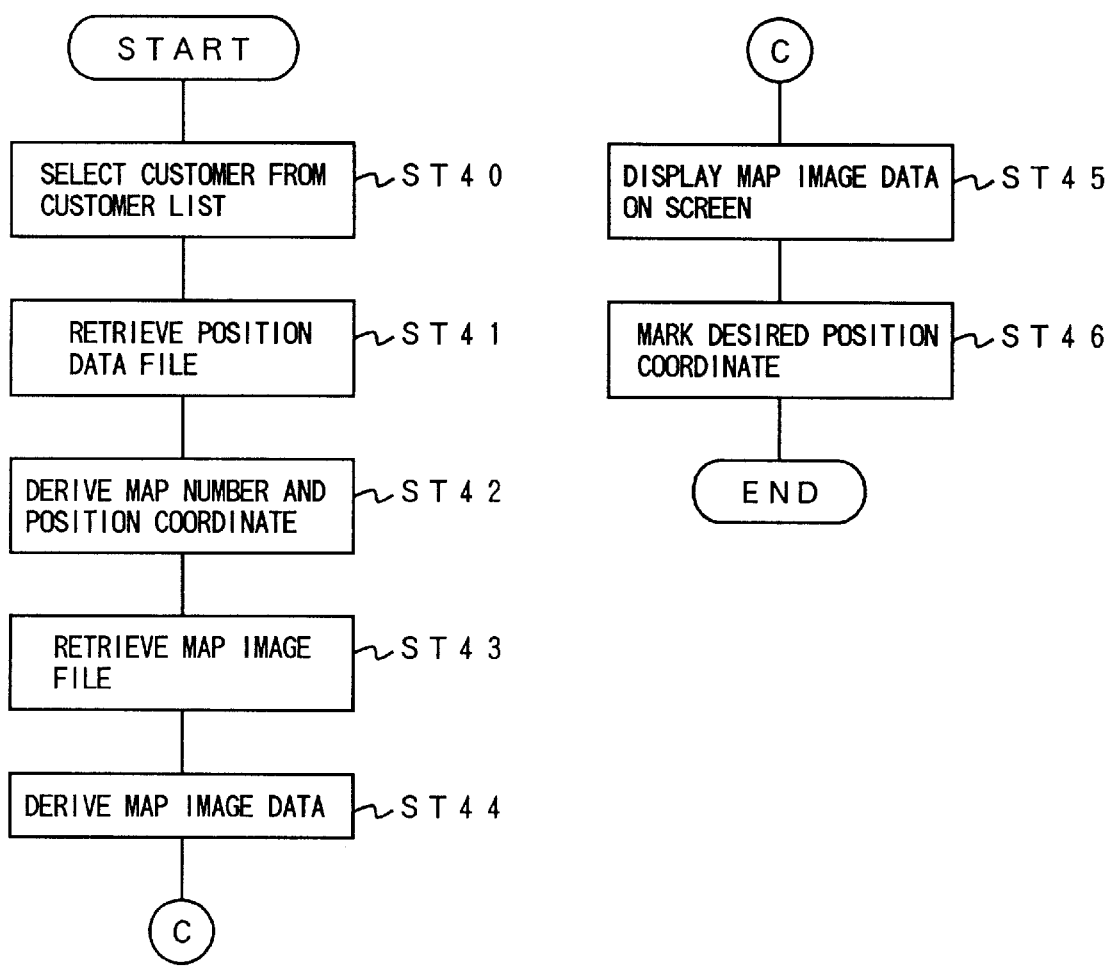
FIG. 30 is a flow chart for explaining a display process operation of map data executed in the portable terminal apparatus of the second embodiment of the present invention.

[Summary of Process Operation Shown in FIG. 30]

In a process operation shown in FIG. 30, map data regarding a customer may be quickly represented on the display 35 of the portable terminal apparatus 30.

[Content of Process Operation Shown in FIG. 30]

FIG. 30 is a flow chart for explaining a display process operation of map data according to the second embodiment.

In this process operation, a specific customer number 400 is first selected from the customer list of the portable terminal apparatus 30, shown in FIG. 29 (step 40).

After the customer number 400 has been selected from the customer list, files of the position data 402 and 403 are retrieved by operating a retrieve key of a map number (step 41).

Next, a map number 401 and positional coordinates 402 and 403 are derived from the files of the position data 402 and 403 (step 42).

After the map number 401 and the positional coordinates 402, 403 have been derived from the files of the position data 402 and 403 in the portable terminal apparatus 30 shown in FIG. 29, a map image file corresponding to the map number is retrieved (step 43).

After the map image file has been retrieved, map image data shown in FIG. 36 is retrieved (step 44).

It should be noted in FIG. 36 that the map data are the map number 600 and the map image data 601.

After the map image data have been derived, this map image data is represented on the screen of the display, 35 employed in the portable terminal apparatus 30 (step 45).

After this map image data has been indicated on the screen of the display 35 provided in the portable terminal apparatus 30 of FIG. 29, the coordinate data are previously registered and thereafter, a desired position coordinate of a customer is marked (step 46).

With execution of the above-described process operation, the display process operation of the map data is accomplished.

As a consequence, the map data about the customer can be quickly represented on the display 35 of the portable terminal apparatus 30.

Figure 31:
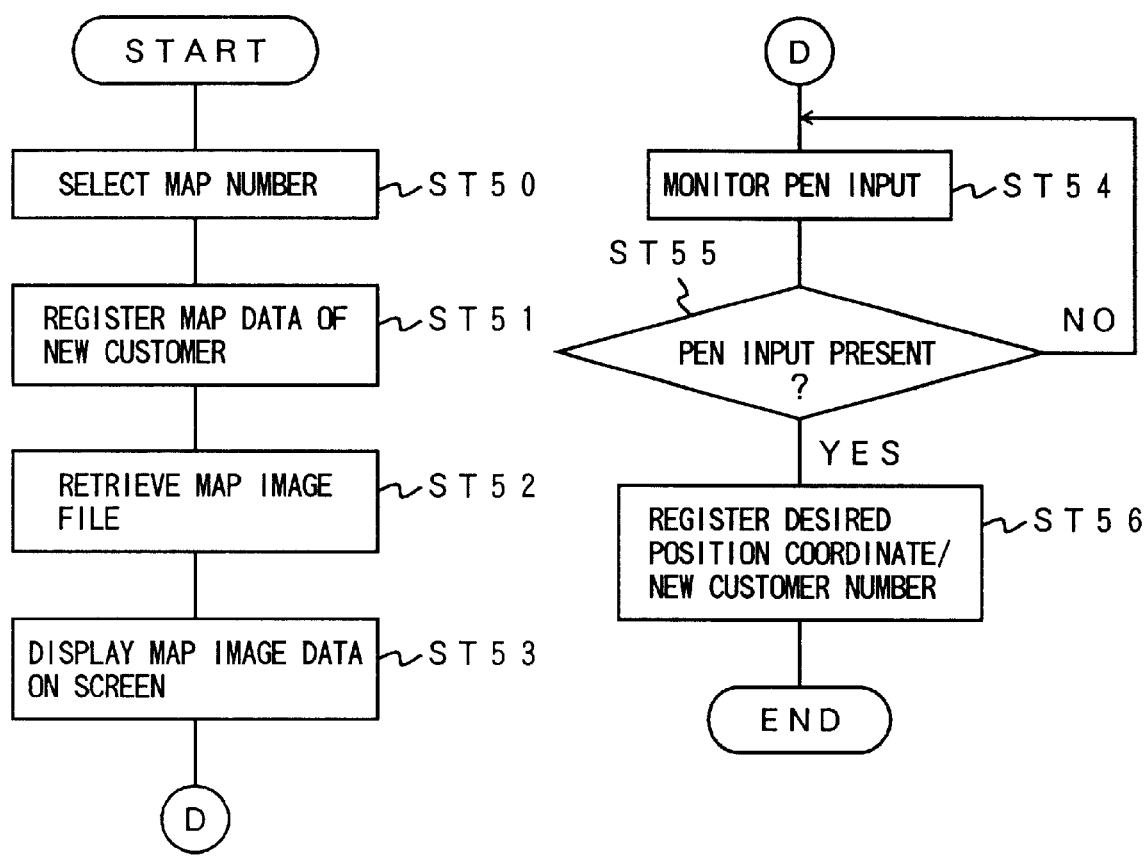
FIG. 31 is a flow chart for explaining a register process operation of the map data executed in the second embodiment of the present invention.

[Summary of Process Operation in FIG. 31]

In accordance with a process operation of FIG. 31, map position data of the portable terminal apparatus 30 can be quickly registered.

[Content of Process Operation in FIG. 31]

FIG. 31 is a flow chart for explaining a registering process operation of map position data.

A process operation to register the map position data is commenced, and a selection is made of, for example, the map number 401 of MR. E from the map coordinate data 42 previously written into the data storage unit 39 shown in FIG. 6 (step 50).

After the map number 401, e.g., the map number of MR. E has been selected from the data storage unit 39 of the portable terminal apparatus 30, new customer map data is written into the storage region of the map coordinate data 41 of the data storage unit 39 to register the new customer map data (step 51).

After the new customer map data has been registered, a map image file corresponding to an address of a new customer is retrieved from the data storage unit 39 of the portable terminal apparatus 30 (step 52).

After map image data 501 corresponding to a map number 600 shown in FIG. 36, for example, is retrieved from the map image file in the data storage unit 39 of the portable terminal apparatus 30, the map image data 501 is displayed on the screen of the display 35 employed in the portable terminal apparatus 30 (step 53).

After the map image data 501 has been displayed on the screen of the display 35 in the portable terminal apparatus 30, the data input operation of touching the touch switch by, e.g., a pen is monitored (step 54 ).

After the data input operation by the pen has been monitored, a check is done as to whether or not a pen input is made (step 55).

When the pen input is made (YES of step 55), a desired position coordinate and a new customer number are registered by touching the touch switch on the display plane (step 56).

That is to say, according to this second embodiment, the touch switch on the display plane is touched by using the pen by the operator so as to designate the position of the new customer. Then, the map coordinate of this new customer is recognized by the portable terminal apparatus so that such information as the map coordinate information and the new customer number is written into the data storage unit 39 of the portable terminal apparatus 30 in combination with the corresponding customer data.

After both of the desired position information and the new customer number have been registered, the map position data registering process for the data storage region is accomplished in the portable terminal apparatus 30.

When there is no pen input at the step 55 (NO of step 55), the process operation is returned to the previous step 54 at which the pen input operation is again monitored.

With execution of the above-explained process operations, the map position data of the portable terminal apparatus 30 can be quickly registered.

Figure 32:
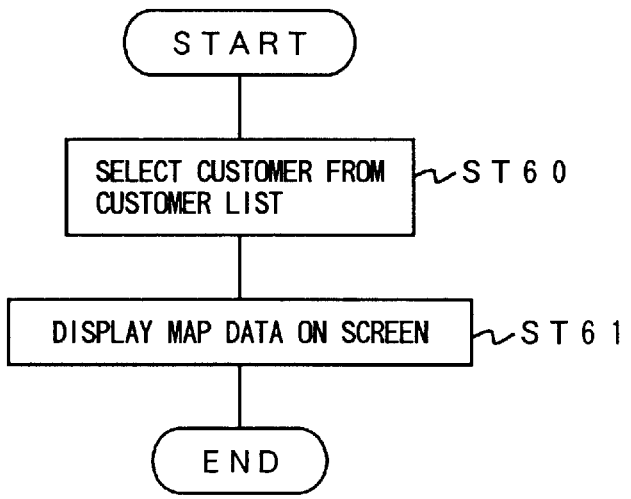
FIG. 32 is a flow chart for describing a display process operation of the map data executed in the second embodiment.

[Summary of Process Operation in FIG. 32]

In a process operation defined in a flow chart of FIG. 32, a completion of a map data display operation can be quickly recognized, and this map data corresponds to customer information.

[Content of Process Operation in FIG. 32]

FIG. 32 is a flow chart for explaining the display process operation of the map data.

After the flow operation of the process to display the map data is started, a desired customer is selected from the customer list (step 60).

After the desired customer has been selected from the customer list, such customer information as an address and a name is represented on the screen of the display 35 employed in the portable terminal apparatus 30 (step 61).

In accordance with this embodiment, the customer information is displayed on the screen of the display 35 in the portable terminal apparatus 30, and then this customer information is confirmed by the operator, so that it is recognizable that the display process of the map data corresponding to the specific customer information is completed.

Figure 33:
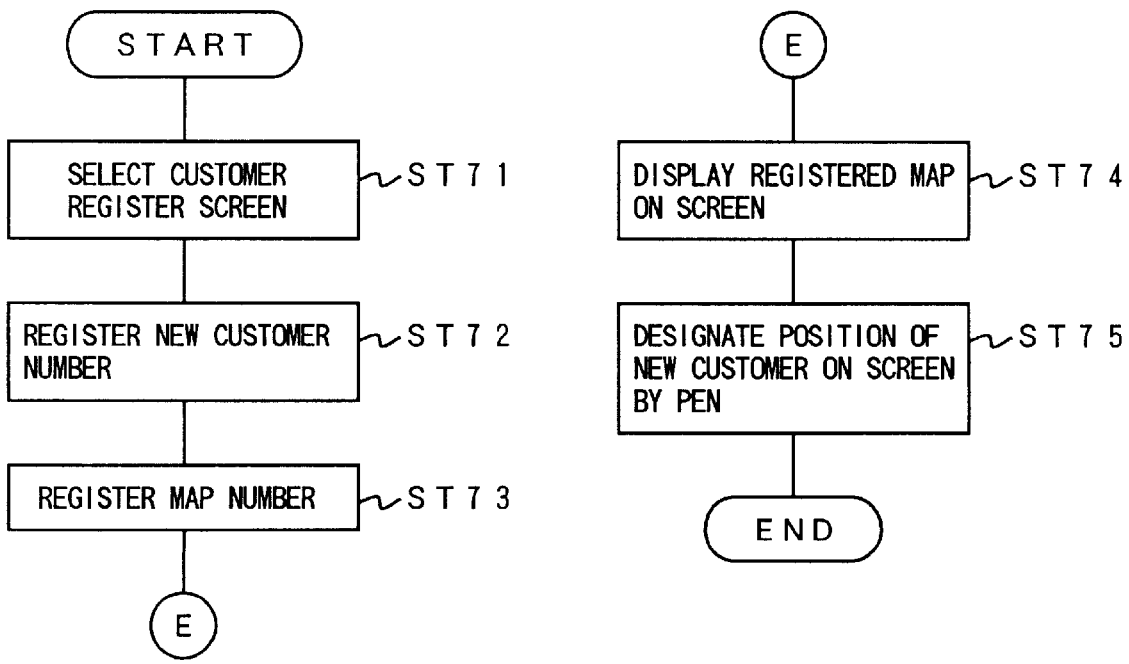
FIG. 33 is a flow chart for explaining a register process operation of new customer data executed in the second embodiment of the present invention.

[Summary of Process Operation in FIG. 33]

According to a process operation defined in FIG. 33, a process operation to register new register data can be quickly performed.

[Content of Process Operation in FIG. 33]

FIG. 33 is a flow chart for explaining the registering process operation of the new customer data.

After a flow operation to execute the new customer data registering process is started, a screen indicative of a customer register condition is directly touched by using a finger or a pen on the display 35 so as to select a displayed screen (step 71).

After the screen indicative of the customer register condition has been selected by the operator, a new customer number corresponding to the customer information such as the address and the name is registered into the data storage unit 39 of the portable terminal apparatus 30 together with the selected customer register screen (step 72).

After the new register number has been registered in the data storage unit 39 of the portable terminal apparatus 30, a map number is registered (step 73).

After the map number has been registered, a map of the registered map number is displayed on the screen of the display 35 (step 74).

A designation by a pen or a finger is made on a position of the new customer on the screen of the display 35 where this map is displayed (step 75).

In accordance with this embodiment, when the map has been registered, the position X402 and the position Y403 corresponding to the position coordinates designated on the map are written into a table (FIG. 35) of the data storage unit 39 of the portable terminal apparatus 30, whereby the register operation of the position coordinate designated on the map is accomplished.

With the execution of the above-described process operation, the register process operation of the new register data can be ended.

As a consequence, the register process of the new register data can be quickly performed.

In accordance with the second embodiment, when the touch switch is depressed by touching the screen of the display 35 by either the pen, or the finger, the key matrix circuit of the depressed touch switch is connected, so that the position of this visit is set into the data storage region.

Accordingly, the new register data set in the data storage region of the portable terminal apparatus 30 is read and transmitted to the computer 60, so that the map data stored in the computer 60 can be quickly updated surely.

[Modification 1 of Second Embodiment]

The data storage unit 39 shown in FIG. 6 is constructed of a memory card. The memory card consists of an IC card or a magnetic card.

In an IC card, for instance, an IC memory is contained in a card-shaped storage medium, and can have a large storage capacity, as compared with that of a magnetic card and a floppy disk. As a result, map information is rewritable in this memory card.

What is claimed is:

1. In a portable terminal apparatus having information processing means for processing such information as image information, an information processing method, comprising:

an information input step for inputting map information of destination, such information regarding a content of a contract, or personal information about a customer into said information processing means;

an information storage step for storing the input information;

an information reading step for reading map information stored in said information storage step;

an information displaying step for displaying a map and one or more destinations to be visited based on inputted map information;

a designation step for designating a visiting order of the destination; and a display sequence determining step for determining a display sequence of the destination on the basis of the designated visiting order, wherein said information displaying step displays a destination to be visited next as distinguished from other destinations based on the designated visiting order and displays only destinations not visited and removes destinations already visited.

2. An information process method as claimed in claim 1 wherein said information storage step includes a registration step for registering the map position designated from said map information display means and the customer data by making them relate to one another.

3. An information process method as claimed in claim 1 wherein said display sequence determining step includes a list display determining step for determining a representation of a customer data list in the designated visiting order.

4. An information process method as claimed in claim 1 wherein said information display step includes a designation display step for displaying the information on the map designated from a display screen of the display in accordance with the display sequence determined by said display sequence determining step.

5. An information processing method as claimed in claim 1, comprising:

an image data storage step for storing an image data of the map; and a designated map display step for displaying the map designated in said image data storage step on the screen.

6. An information processing method as claimed in claim 1, including:

a step for displaying customer information on the map.

7. An information processing method as claimed in claim 1, including:

a display step for displaying a customer data in the customer visiting sequence on the basis of the customer visiting sequence information.

8. An information processing method as claimed in claim 1, including:

a step for displaying a a customer visit or a contract of a customer on the map.

9. An information processing method as claimed in claim 1, including:

a step for newly registering such information as an address of a customer on the basis of the map information.

10. A portable terminal apparatus equipped with an information processing means for processing information such as image information, comprising:

information input means for inputting map information of destination, either information about a content of a contract, or personal information into said information processing means;

information storage means for storing the information input from said information input means;

information reading means for reading said map information from said information storage means;

display means for displaying a map, and one or more destinations to be visited, based on the map information;

designation means for designating a visiting order of the destination;

display sequence determining means for determining a display sequence of the destination based on a designated visiting order, wherein said information display means displays a destination to be visited next as distinguished from other destinations based on the designated visiting order, and wherein said information display means displays only destinations not visited and removes destinations already visited from the display means.

11. A portable terminal apparatus as claimed in claim 10, wherein said information input means includes a touch switch on a display plane of a display.

12. A portable terminal apparatus as claimed in claim 10, wherein said information storage means includes a memory card.

13. A portable terminal apparatus as claimed in claim 10, further comprising:

a host computer for transmitting the display sequence determined information derived from said display sequence determining unit via a data line.

14. A portable terminal apparatus as claimed in claim 10, wherein said information storage means includes a register means for registering the map position designated from said map information display means and the customer data in connection with said map position.

15. A portable terminal apparatus as claimed in claim 10, wherein said display sequence determining means includes a list display determining means for determining a representation of a customer data list in the designated visiting order.

16. A portable terminal apparatus as claimed in claim 10, wherein said information display means includes a designation display means for displaying the information on the map designated from a display screen of said display in accordance with the display sequence determined by said display sequence determining means.

17. A portable terminal apparatus equipped with an information processing means for processing information such as image information, comprising:

information input means for inputting map information of destination, either information about a content of a contract, or personal information into said information processing means;

information storage means for reading said map information from said information storage means;

display means for displaying a map and one or more destinations to be visited based on the map information;

designation means for designating a visiting order of the destination;

display sequence determining means for determining a display sequence of the destination based on a designated visiting order, wherein said input means provides an instruction regarding one or more destinations to be visited by touching the display means, and said designation means sets the order of destinations to be visited according to the instruction, and wherein said information display means displays only destinations not visited and removes destinations already visited from the display means.

18. In a portable terminal apparatus having information processing means for processing such information as image information, an information processing method, comprising:

an information input step for inputting map information of destination into said information input step;

an information storing step for storing the input information;

an information displaying step for displaying a map and a destination on a display based on the input information;

a designation step for designating a visiting order of the destination selected from the information input means; and a display sequence determining step for determining a display sequence on the basis of a designated visiting order, wherein said information displaying step displays a destination to be visited next as distinguished from other destinations based on the designated visiting order and displays only destinations not visited and removes destinations already visited.

19. A portable terminal comprising:

a display unit;

a processing unit; and a memory containing map image data used for displaying a map on the memory display unit, and destination information, the destination information at least containing a personal information of a destination and a position information which shows a position of the destination on the map, wherein the processing unit designates a visiting order of designations and stores a visiting order information corresponding to the destination into the memory, such that when one of the destinations is visited, the processing unit retrieves from the memory a destination to be visited next based on the visiting order information, and displays the destination to be visited next onto the display unit as distinguished from the other destinations, displays only destinations not visited and removes destinations already visited.

20. A portable terminal according to claim 19, wherein the processing unit displays the destination to be visited next on the map, as distinguished from the other destinations displayed on the map.

21. A portable terminal unit, comprising:

a display unit;

a processing unit;

a first memory for storing map image data used for displaying a map on the display unit; and a second memory for storing a customer file, the customer file containing information for identifying each customer, position information indicating a position of the customer on the map to be displayed on the display unit, and contract condition information indicating if each customer made a contract or not, wherein the processing unit rewrites the contract condition information when a contract is made by the customer, wherein when one of the customer makes a contract, the processing unit retrieves another customer that has not made a contract yet from the second memory, wherein the processing unit displays the customer retrieved from the second memory on the display unit, and wherein the processing unit eliminates the customer which made the contract from the display unit.

* * * * *

UNITED STATES PATENT AND TRADEMARK OFFICE
CERTIFICATE OF CORRECTION

PATENT NO.     : 6,549,192 B1
DATED          : April 15, 2003
INVENTOR(S)    : Shigeru Fujita et al.

It is certified that error appears in the above-identified patent and that said Letters Patent is hereby corrected as shown below:

<u>Title page,</u>
Item [56], References Cited, U.S. PATENT DOCUMENTS, insert the following:
-- 5,272,638     12/1993        Martin et al.     364/42 --

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,549,192 B1
DATED : April 15, 2003
INVENTOR(S) : Shigeru Fujita et al.

It is certified that error appears in the above-identified patent and that said Letters Patent is hereby corrected as shown below:

Title page,
Item [56], References Cited, U.S. PATENT DOCUMENTS, insert the following:
-- 5,272,638    12/1993    Martin et al.    364/444 --

This certificate supersedes Certificate of Correction issued July 13, 2004.

Signed and Sealed this

Twenty-first Day of September, 2004

JON W. DUDAS
*Director of the United States Patent and Trademark Office*